United States Patent [19]
Kobayashi

[11] Patent Number: 5,937,089
[45] Date of Patent: Aug. 10, 1999

[54] COLOR CONVERSION METHOD AND APPARATUS

[75] Inventor: Yasushi Kobayashi, Tokyo, Japan

[73] Assignee: Oki Data Corporation, Tokyo, Japan

[21] Appl. No.: 08/949,299

[22] Filed: Oct. 13, 1997

[30] Foreign Application Priority Data

Oct. 14, 1996 [JP] Japan .................................. 8-291061
Aug. 25, 1997 [JP] Japan .................................. 9-243444

[51] Int. Cl.$^6$ .................................. G03F 3/08; G06K 9/00
[52] U.S. Cl. .......................... 382/167; 358/518; 358/520
[58] Field of Search .................................. 382/162, 166, 382/167; 358/518, 520, 519, 521, 525; 345/425, 427, 431–432, 150, 153; 348/453; 395/101, 109

[56] References Cited

U.S. PATENT DOCUMENTS

| | | | |
|---|---|---|---|
| 5,712,925 | 1/1998 | Ohga | 382/167 |
| 5,767,992 | 6/1998 | Tanaka et al. | 382/167 |
| 5,867,284 | 2/1999 | Heinrichs et al. | 358/518 |
| 5,867,286 | 2/1999 | Lee et al. | 382/167 |

FOREIGN PATENT DOCUMENTS

61-288690 12/1986 Japan .
62-230159 10/1987 Japan .

*Primary Examiner*—Leo H. Boudreau
*Assistant Examiner*—Bhavesh Mehta
*Attorney, Agent, or Firm*—Panitch, Schwarze, Jacobs & Nadel, P.C.

[57] ABSTRACT

A color conversion method maps input colors to output colors by first scaling the color coordinate system to reduce the difference between the gamut of reproducible input colors and the gamut of reproducible output colors. After scaling, input colors are mapped onto a polyhedron approximating the gamut of reproducible output colors. The polyhedron has vertices at the output white and black colors, and at least three of the most vivid reproducible output colors. In the mapping process, these most vivid colors are left fixed, and the input white and black colors are mapped to the output white and black colors.

40 Claims, 28 Drawing Sheets

COLOR CONVERSION METHOD AND APPARATUS

BACKGROUND OF THE INVENTION

The present invention relates to a color conversion method that enables a color image generated for one type of output device to be output by a different device.

Color conversion becomes necessary when, for example, a color image generated in a computer for display on a cathode-ray-tube (CRT) monitor is printed on paper by an ink-jet color printer, or an electrophotographic color printer. The CRT employs additive color mixing of the three primary colors red, blue, and green. The color printer employs subtractive color mixing of inks (or toner) of the three primary colors cyan, magenta, and yellow, or the four colors cyan, magenta, yellow, and black. The CRT can generally reproduce a larger gamut of colors than the printer, so a color conversion or mapping process is required. Various methods have been proposed.

Japanese Kokai Patent Application 88589/1993 describes a method of projecting the CRT's color space onto the printer's color space along lines linking each color to the white point on the chromaticity diagram. For each such line, the ratio of the most saturated color reproducible by the printer to the most saturated color reproducible by the CRT is determined, and the entire line is contracted or expanded by that ratio.

In practice, these most saturated reproducible colors can be difficult to determine. This is particularly true of the printer, because of extraneous absorption by each color of ink. Essentially the only way to determine the full gamut of colors that a color printer can reproduce is by actual measurement of samples of all the colors the printer can print. The measurement results would then have to be stored in some systematic way and referred to in the color conversion process, but the amount of data to be measured, stored, and referred to would be impractically large.

Japanese Kokai Patent Application 34546/1996 describes a method that constructs a polygon in the chromaticity diagram for each lightness level. The vertices of the polygon represent the maximum reproducible saturations of hues corresponding to the primary pigments used by the printer, and to secondary combinations of these pigments. This polygon approximately outlines the gamut of colors that the printer can reproduce. Input colors disposed within the polygon are left unaltered. Input colors external to the polygon are mapped onto the intersection of an edge of the polygon with a line joining the input color to the white point in the chromaticity diagram.

Use of a polygonal approximation reduces the amount of data to be stored, although if a separate polygon is used for each lightness level, the amount of data is still large. Mapping all colors external to the polygon onto the edges of the polygon eliminates the need to determine the most saturated reproducible colors in the input system, although since a range of saturations is mapped onto a single point, there is a loss of saturation information. Considerable vividness may also be lost in this way, as described later.

A problem with both of these methods is that the white point on the chromaticity diagram of the CRT rarely coincides with the white point on the chromaticity diagram of the printer. The white point of a color printer is the paper white color: the color of the paper on which the image is printed, which virtually never matches the white point of the CRT. A further complication is that in a color printer, differing from a CRT, the chromaticity coordinates of the color black (either the color of the black ink, or the color black as reproduced by mixing cyan, magenta, and yellow) rarely match the chromaticity coordinates of the color white. As a result, when the above methods are applied, hues are altered, points that should be white, gray, or black become tinged with color, and the quality of the printed image is visibly degraded.

SUMMARY OF THE INVENTION

It is accordingly a general object of the present invention to reduce color distortion when a color image is converted from one output device to another output device.

A more particular object is to convert white, gray, and black without introducing unwanted color.

A further object is to convert vivid colors vividly.

The invented method of color conversion converts input colors reproducible by a first color image output device to output colors reproducible by a second color image output device. The method employs a color coordinate system with separate lightness and chromaticity coordinates, and comprises at least one of the steps of:

scaling the color coordinate system according to the ratio of the lightness difference between the input white color and input black color to the lightness difference between the output white color and output black color; and mapping input colors onto a first polyhedron approximating the gamut of colors reproducible by the second color image output device.

Scaling is preferably performed on both the lightness and chromaticity coordinates.

The first polyhedron has vertices at the output white color, the output black color, and at least three most vivid colors of different hues, these colors being the most vivid shades of those hues reproducible by the second color image output device.

In the mapping step, the most vivid colors are left fixed, and the input white axis, joining the input white color to the input black color, is preferably mapped to the output white axis, joining the output white color to the output black color. The mapping step may be performed directly onto the first polyhedron. Alternatively, the mapping may be performed by way of a second polyhedron having as vertices the above most vivid colors and two colors on the input white axis.

The mapping step preferably includes the calculation of a point of intersection, in a chromaticity diagram, of a polygon defined by the above most vivid colors with a line extending from the input white axis through the input color to be mapped. When the mapping is performed directly onto the first polyhedron, the hue of this point of intersection, as viewed from a point on the output white axis, determines the hue of the output color.

When the mapping is performed by way of the second polyhedron, an edge color on the second polyhedron is found, having the same chromaticity as the above point of intersection, and a gray color is selected on the input white axis, having the same lightness as the edge color. If the input color is exterior to the second polyhedron, the input color is first mapped onto the surface of the second polyhedron, along a line joining the input color to this gray color. Then the input white axis, and other colors in the second polyhedron, are mapped to the output white axis, and to other colors in the first polyhedron.

The scaling step reduces distortion by reducing the necessary amount of mapping.

Mapping of the input white axis onto the output white axis ensures that input white, gray, and black will be rendered as output white, gray, and black.

Holding the most vivid colors fixed during the mapping step ensures that input colors with lightness and hue values equal to these most vivid colors, and with equal or greater saturation, will be reproduced as vividly as possible by the second color image output device.

Mapping toward the gray color described above allows lightness levels to be altered in order to avoid loss of vividness, so that input colors with lightness levels differing from the lightness levels of the most vivid colors can also be reproduced vividly.

DETAILED DESCRIPTION OF THE INVENTION

Embodiments of the invention will be described with reference to the attached illustrative drawings.

Some of these embodiments will employ the CIE Yxy color coordinate system, in which Y is the luminance or lightness coordinate, and x and y are chromaticity coordinates. This is the system standardized by the International Commission on Illumination (Commission Internationale de l'Eclairage) in 1931. Other embodiments will employ the CIE LAB color coordinate system, in which the lightness coordinate is designated by $L^*$, and the chromaticity coordinates by $a^*$ and $b^*$.

The invention is not restricted to the above two coordinate systems. Any color coordinate system having separate lightness and chromaticity coordinates can be used.

Color images can be encoded in coordinate systems not having separate lightness and chromaticity coordinates, such as the red-green-blue (RGB) color coordinate system often employed for CRT monitors. This does not prevent practice of the present invention, because such coordinate systems can easily be transformed to a coordinate system having separate lightness and chromaticity coordinates. Formulas for the necessary coordinate transformations are well known.

The chromaticity coordinates of a color can be expressed in a chromaticity diagram in which lightness is ignored. The hue of a color refers to the direction of the color from the gray color of equal lightness. In a coordinate system in which white, black, and gray all have the same chromaticity coordinates, this gray color may be referred to as the white point on the chromaticity diagram.

The terms vividness and saturation are both used herein to indicate the distance of a color from the gray color of equal lightness. The terms vivid, saturated, and vividly will also be used in this sense.

The term saturation is sometimes used in the literature to indicate the angular separation of a color from the color white, as seen from the color black, but saturation will not be used with this meaning below.

The term 'shades' will be used to refer to colors having the same hue but different lightnesses and/or saturations.

It will be assumed that the input colors described below have been generated for reproduction by a color display device, e.g. a color CRT monitor, and that the output colors will be reproduced by a color printer using inks with the primary colors cyan, magenta, and yellow.

First Embodiment

The scaling step will be described in the first embodiment. Detailed descriptions of the mapping step will be deferred to later embodiments.

Figure 1:
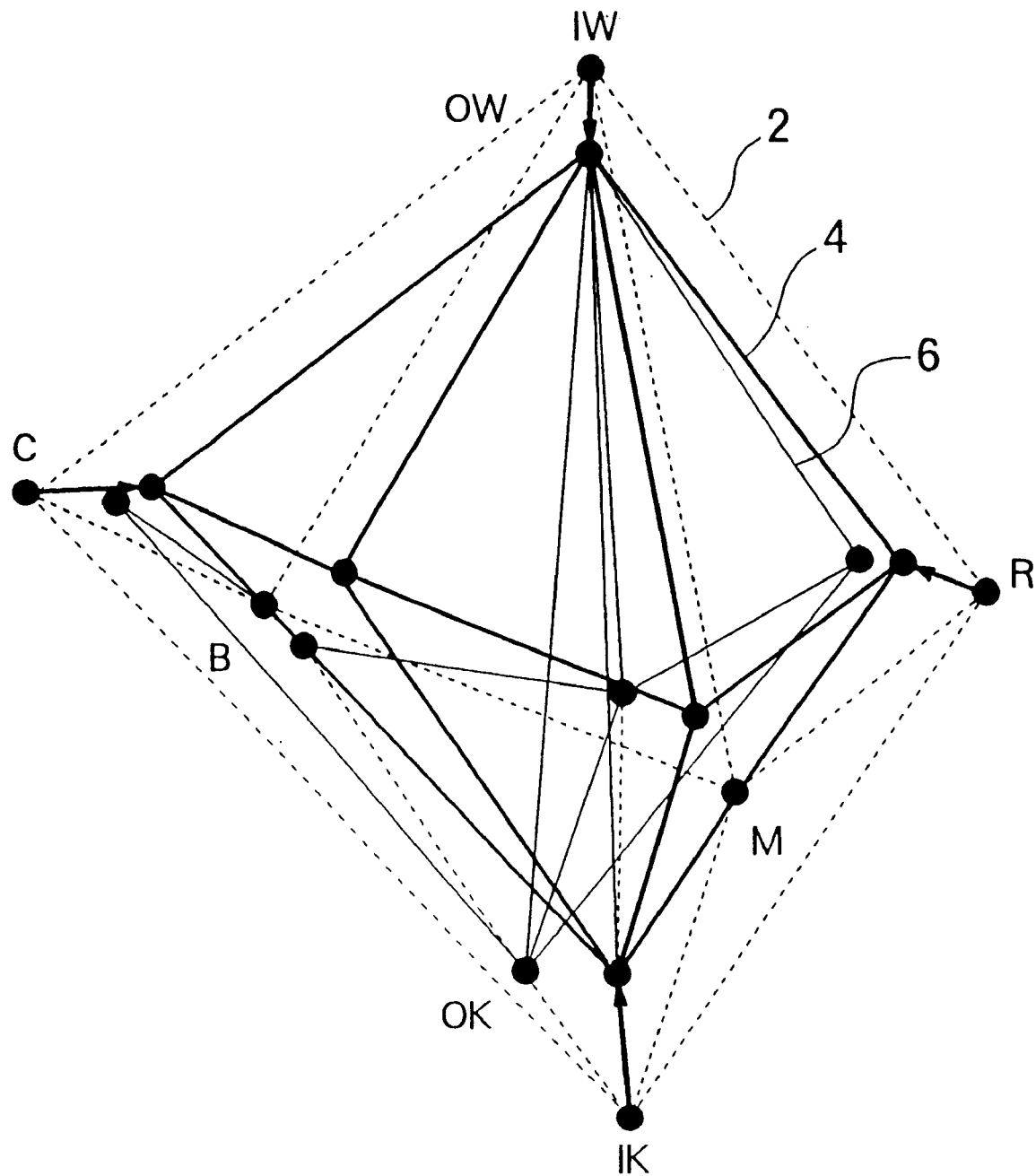
FIG. 1 illustrates the scaling step.

The scaling step is illustrated in FIG. 1, which shows three polyhedra, each having eight vertices.

The polyhedron 2 indicated by the dotted line is a polyhedral approximation to the gamut of reproducible input colors. Vertex IW is the input white color, and IK is the input black color; among all reproducible input colors, these are the colors with maximum and minimum lightness, respectively. Vertices C, B, M, and R are the most vividly reproducible input colors with the hues cyan, blue, magenta, and red. Two similar vertices for yellow and green are present, but are not visible because they are at the back of the polyhedron 2.

The scaling process shrinks this polyhedron 2 to the polyhedron 4 indicated by thick lines. The scaling factor is equal in all directions.

The polyhedron 6 indicated by thin lines is a polyhedral approximation to the gamut of reproducible output colors. Vertices OW and OK are the output white and black colors: the reproducible output colors with maximum and minimum lightness. The other vertices of this polyhedron 6 represent the most vividly reproducible shades of cyan, blue, magenta, red, yellow, and green in the output color space (the yellow and green vertices are not visible).

Polyhedron 6 is the first polyhedron mentioned above, and will also be referred to in later embodiments as the output polyhedron, or opol.

It can be seen that the scaling step reduces the difference between the gamut of reproducible input colors and the gamut of reproducible output colors.

Figure 2:
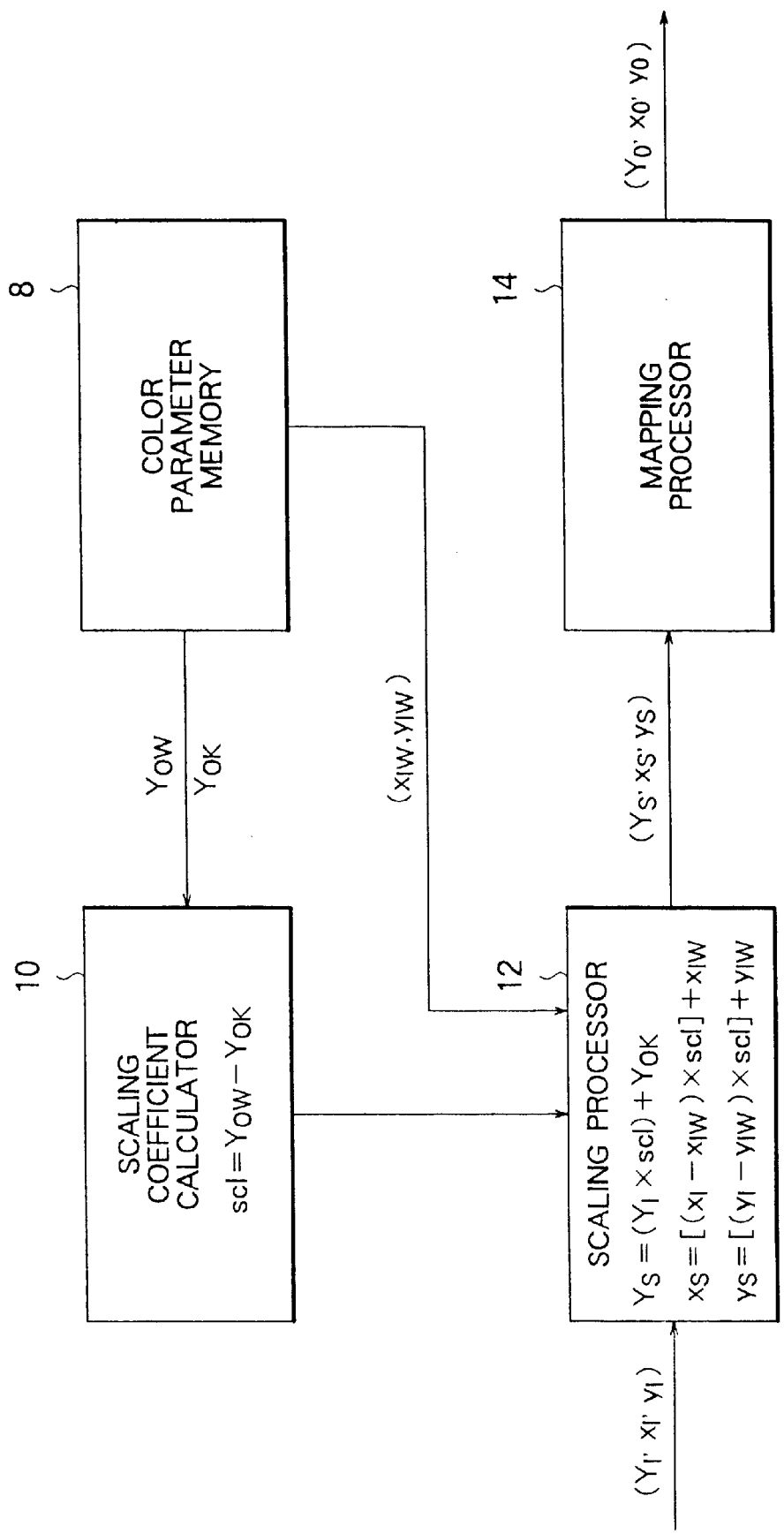
FIG. 2 illustrates a color conversion apparatus used in a first embodiment of the invention for performing the scaling step, followed by the mapping step.

FIG. 2 shows the configuration of a color conversion apparatus that carries out the above scaling step, followed by the mapping step. The components are a color parameter memory 8, a scaling coefficient calculator 10, a scaling processor 12, and a mapping processor 14. Use of the CIE Yxy coordinate system is assumed.

The color parameter memory 8 stores the coordinates of the input white and black colors, and the lightness coordinates of the output white and black colors. To simplify the description, it will be assumed below that the coordinate system is normalized so that input white has a tightness coordinate of one (1.0), input black has a lightness coordinate of zero (0.0), and input white, input black, and all intermediate shades of input gray have the same chromaticity coordinates $x_{IW}$ and $y_{IW}$. The lightness coordinates of output white and output black are $Y_{OW}$ and $Y_{OK}$, respectively.

This color conversion apparatus operates as follows.

The scaling coefficient calculator 10 subtracts $Y_{OK}$ from $Y_{OW}$ to calculate a scaling coefficient (scl).

The scaling processor 12 receives the coordinates ($Y_I$, $x_I$, $y_I$) of an arbitrary input color, and performs the scaling operation described by the following equations to produce scaled coordinates ($Y_S$, $X_S$, $y_S$), using the scaling coefficient scl provided by the scaling coefficient calculator 10 and the input white x and y coordinates $x_{IW}$ and $y_{IW}$ supplied by the color parameter memory 8.

$$Y_S = (Y_I \times \text{scl}) + Y_{OK}$$

$$x_S = [(x_I - x_{IW}) \times \text{scl}] + x_{IW}$$

$$y_S = [(y_I - y_{IW}) \times \text{scl}] + y_{IW}$$

The mapping processor 14 then operates on the scaled coordinates ($Y_S$, $X_S$, $y_S$). The mapping process can be carried out in several alternative ways, as described below. The mapping process generates the coordinates ($Y_O$, $x_O$, $y_O$) of the output color produced by the apparatus.

Figure 3:
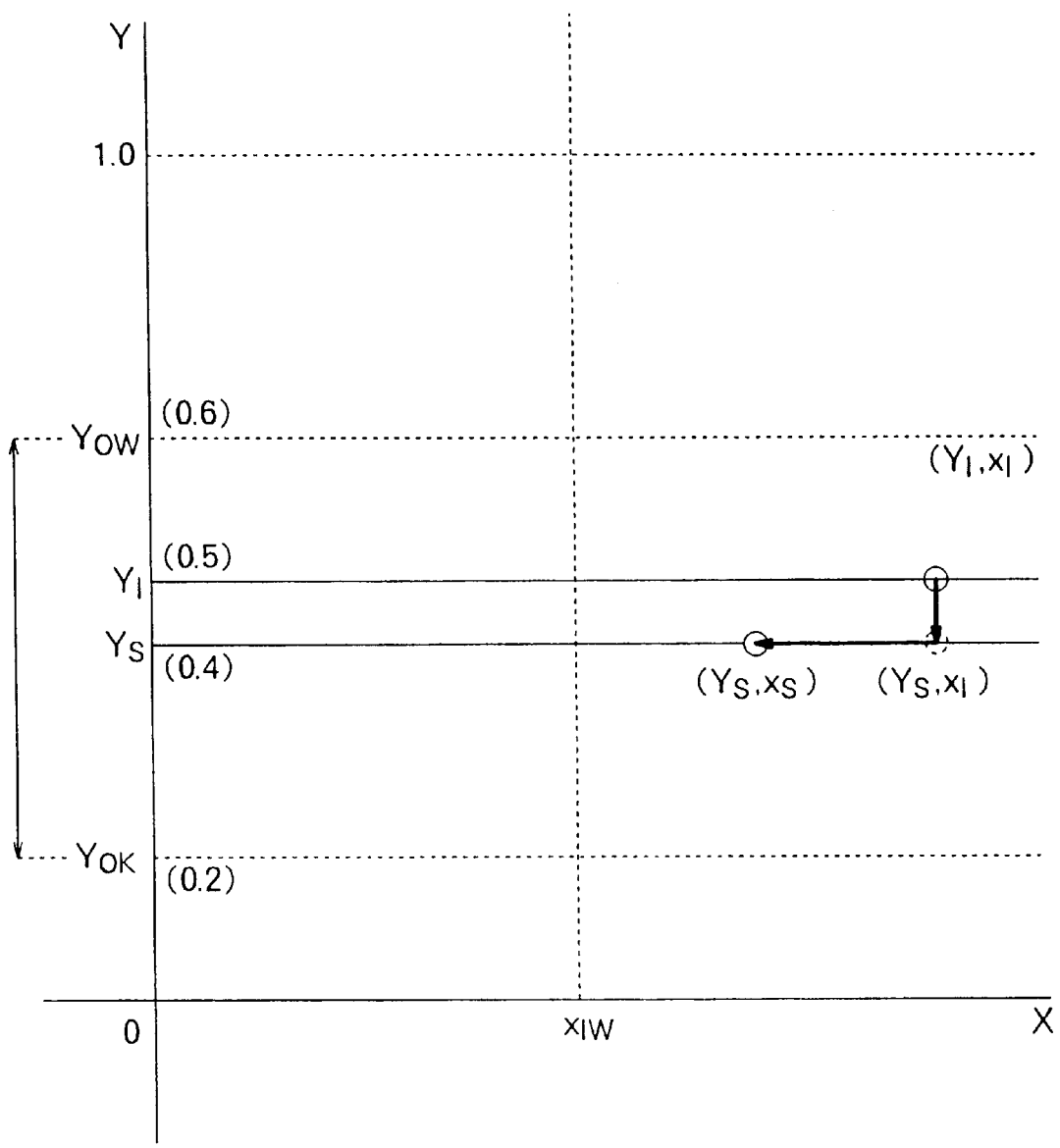
FIG. 3 illustrates scaling of lightness and chromaticity.

FIG. 3 illustrates the scaling process in the xY plane, when the maximum and minimum reproducible output lightness levels ($Y_{OW}$ and $Y_{OK}$) are 0.6 and 0.2, respectively, and the input color ($Y_I$, $x_I$) has a relative lightness of fifty percent (0.5). The first equation given above maps this color to a color ($Y_S$, $x_I$) with a lightness value of 0.4, which is the fifty-percent output lightness level. The second equation further moves this color toward the white axis (the axis with x-coordinate $x_{IW}$). The scaling factor (scl) is 0.4 in both the x- and Y-directions.

Figure 4:
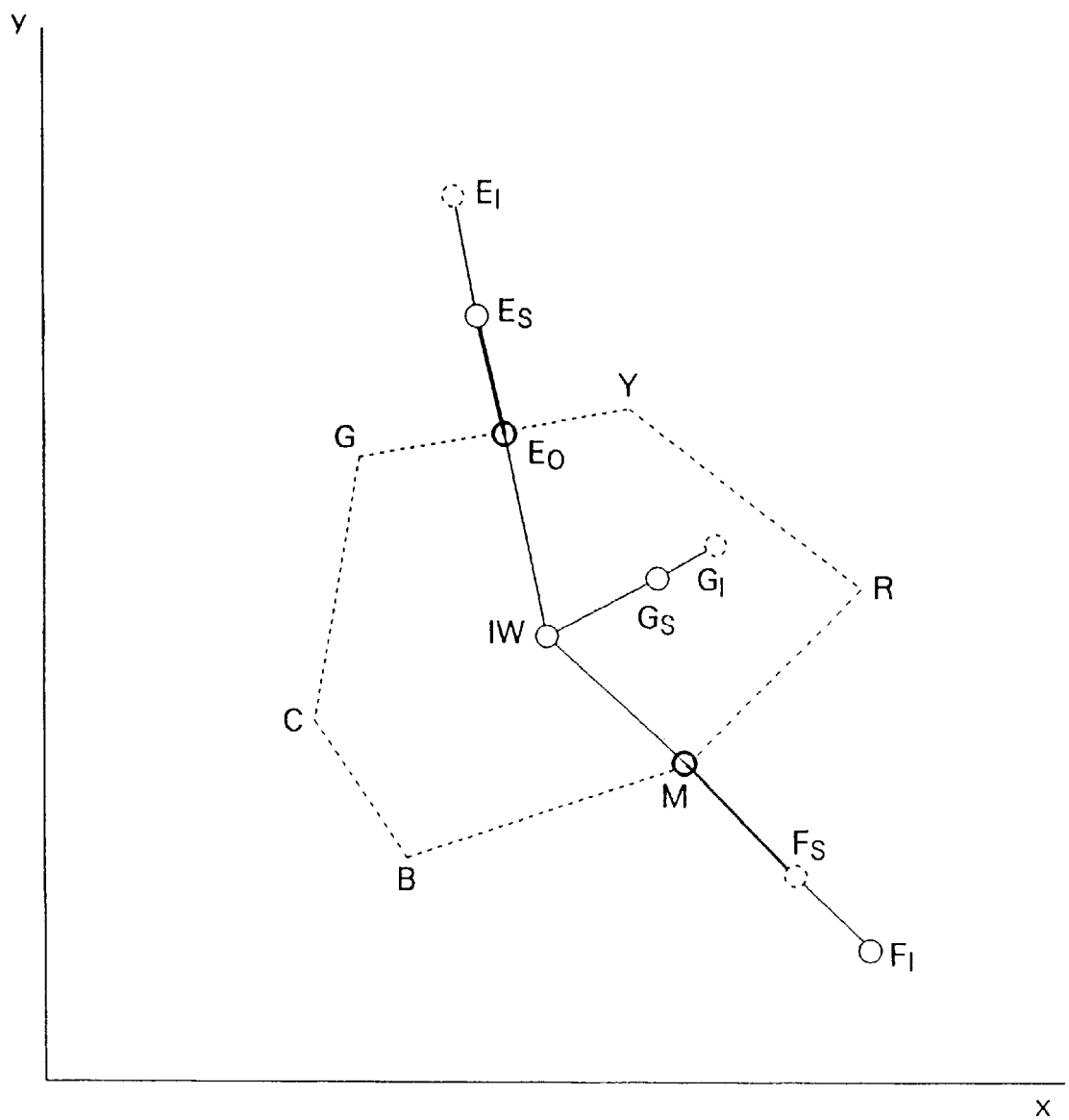
FIG. 4 illustrates scaling in the chromaticity plane.

FIG. 4 illustrates a similar scaling process in the x-y plane, this time with a scaling factor of approximately seven-tenths (scl=0.7). Polygon CBMRYG approximates the outer saturation limits of the reproducible output colors.

Input colors $E_I$, $F_I$, and $G_I$ are scaled to colors $E_S$, $F_S$, and $G_S$, respectively. In one type of mapping process, $E_S$ will be mapped to color $E_O$ on polygon CBMRYG. All intermediate colors on the line segment $E_S E_O$ will also be mapped to $E_O$, so saturation differences on segment $E_S E_O$ will be lost. Similarly, saturation differences on segment $F_S M$ will be lost, as all colors on this segment are mapped to the color M.

Without scaling, however, much more saturation information would be lost: all colors on segment $E_I E_O$ would be mapped to the color $E_O$, and all points on segment $F_I M$ to the color M.

As FIG. 4 shows, the effect of the scaling step is to reduce distortions caused by the mapping step, by reducing the amount by which colors must be moved during the mapping process. Scaling is generally effective in this way, regardless of the manner in which the mapping step is carried out.

Although scaling coefficients (scl) less than unity were illustrated above, the scaling step can also be carried out with scaling coefficients greater than unity, if the reproducible output lightness range is greater than the reproducible input lightness range. When the scaling coefficient is greater than unity, the effect of sealing is to expand the input color space to fill out the reproducible range of the output color space, so that the output image does not appear pale or dim.

The first embodiment used a single scaling coefficient for both lightness and chromaticity, but it is also possible to use one scaling coefficient for lightness and a different scaling coefficient for chromaticity, even if both coefficients are determined from the input and output white and black coordinates. One of the scaling coefficients may be arbitrarily set equal to unity; that is, the scaling process can be restricted to lightness alone, or to chromaticity alone.

Second Embodiment

The second embodiment illustrates a method of carrying out the mapping step. It wilt be assumed that the scaling step has already been performed, although the second embodiment can also be adapted for use without scaling, if so desired.

CIE LAB color coordinates will be used in the second embodiment. The input white axis (the line joining the input white and black colors) will be assumed to have chromaticity coordinates of zero (a*=0 and b*=0).

Figure 5:
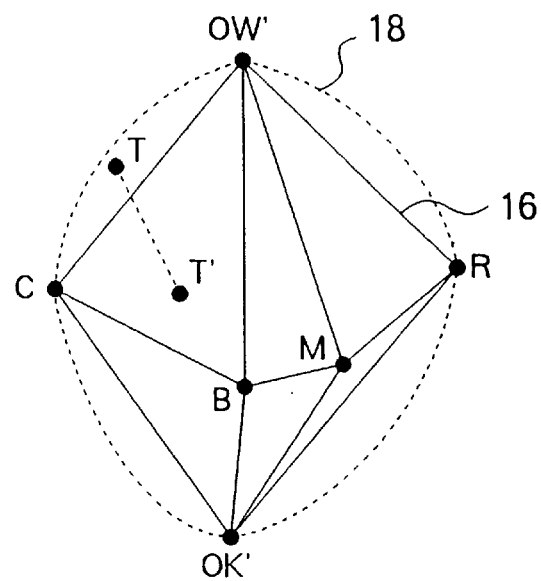
FIG. 5 illustrates the color projection process performed in a second embodiment of the invention, using the second polyhedron.

FIG. 5 illustrates the general plan of the color projection process in the second embodiment. The gamut of reproducible output colors is now approximated by a polyhedron 16 with vertices OW', OK', C, B, N, R, Y (not visible), and G (not visible). This polyhedron 16 is the second polyhedron mentioned earlier, and will also be referred to as opol' below.

The color OW' is disposed on the input white axis, but has the same tightness value as the output white color. Similarly, the color OK' is disposed on the input white axis, but has the same lightness value as the output black color. These colors OW' and OK' represent the input white and black colors after scaling.

The colors C, B, M, R, Y, and G represent the most vividly reproducible output shades of the six hues cyan, blue, magenta, red, yellow, and green. The coordinates of these six most vivid colors are the chromaticity and lightness coordinates when these colors are printed at the 100% level.

It is not necessary to use six most vivid colors to define the polygon of most vivid colors, as long as the number of most vivid colors is at least three. If only three colors are used, they should be the three primaries of the device that will reproduce the colors, e.g. cyan, magenta, and yellow for a typical color ink-jet printer. If six colors are used, it is advisable to employ the three primaries and their complementary or secondary colors, e.g. red, blue, and green.

The edges of polyhedron opol' linking these colors C, B, M, R, Y, and G will be referred to as vivid edges.

The gamut of reproducible input colors (denoted igam below) is indicated by a dashed line 18 in FIG. 5. In the second embodiment, an input color T which lies outside the second polyhedron 16 is first mapped obliquely onto an intermediate color T' on the surface of the polyhedron 16. This process will be referred to as color projection.

Figure 6:
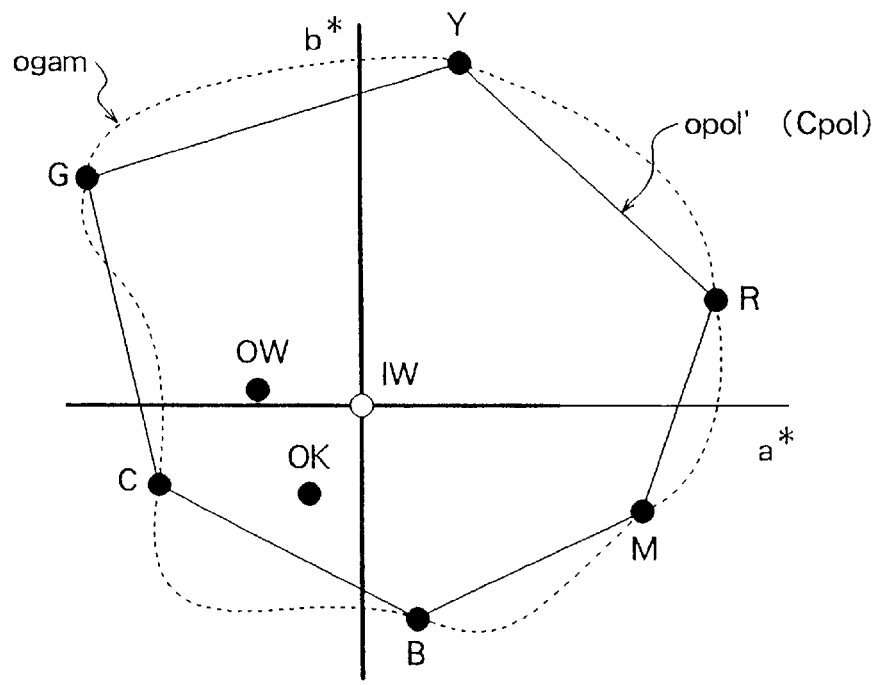
FIG. 6 shows the second polyhedron projected onto the chromaticity plane.

FIG. 6 shows the polyhedron opol', input white color IW, output white color OW, and output black color OK projected onto a chromaticity diagram in the a*b* plane. For a color printer, the output white color OW is the paper white color, and the output black color (OK) is produced by, for example, printing all three primary colors (cyan, magenta, and yellow) at the 100% level.

The projections of the most vivid colors (C, B, M, R, Y, and G) form a polygon which will be referred to as Cpol. Also indicated in FIG. 6 is the outline of the gamut of output colors, denoted ogam, that are actually reproducible.

Figure 7:
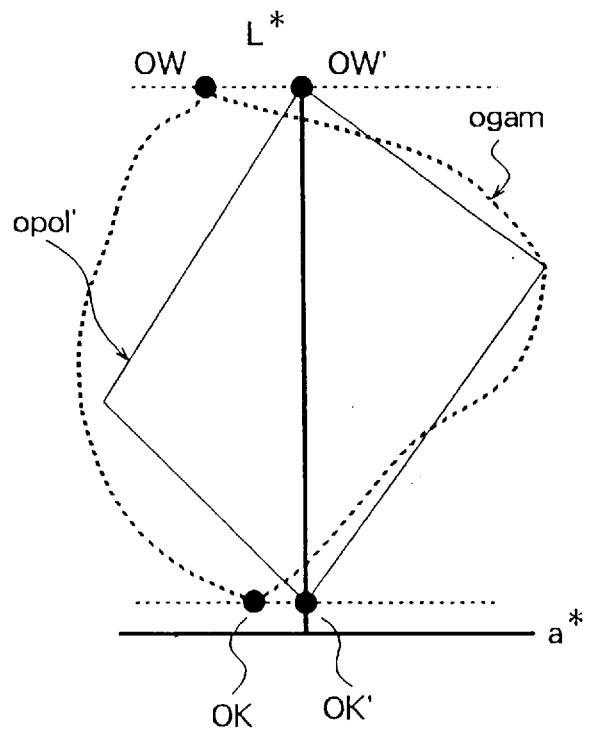
FIG. 7 shows a sectional view of the second polyhedron.

FIG. 7 shows the second polyhedron opol' and gamut of reproducible output, colors ogam projected onto the L*a* plane. The colors OW' and OK' are obtained by constructing perpendicular lines from the output white color OW and output black color OK to the L* axis. As shown, the most vivid colors need not all have the same lightness level.

Figure 8:
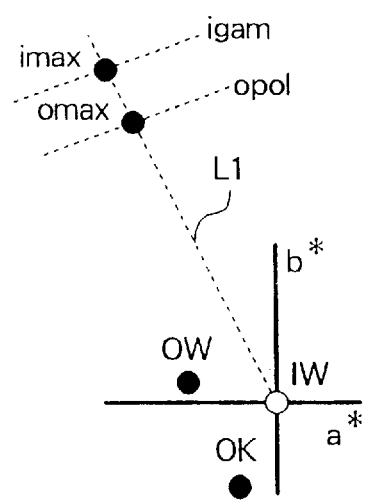
FIG. 8 illustrates the color projection process in the chromaticity plane.

FIG. 8 illustrates a color projection process performed as a first part of the mapping step in the second embodiment, as seen in the a*b* plane. An input color imax having maximum saturation in the input color space, disposed outside the second polyhedron opol', is projected onto a color omax on the surface of polyhedron opol'. The color omax is disposed at the intersection of the surface of polyhedron opol' with a line joining imax to a certain point on the input white axis, which is also the white axis of the color coordinate system. Colors on the segment joining imax to omax are also projected onto omax. Colors on the segment L1 joining omax to the white axis remain fixed.

Figure 9:
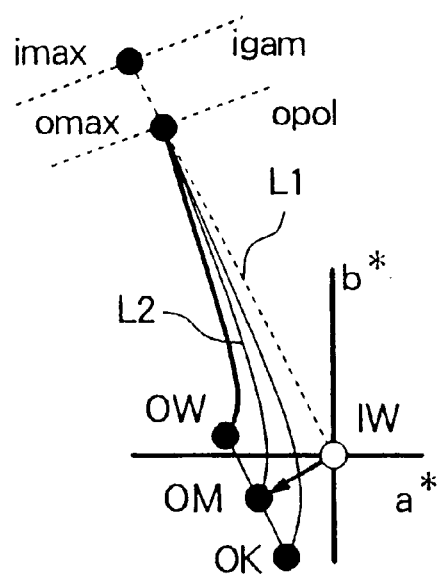
FIG. 9 illustrates a white adjustment process performed in the second embodiment.

FIG. 9 illustrates a white adjustment process performed after the color projection process. Colors on the segment L1 are now mapped to colors on a segment L2 joining omax to a color OM on the white axis of the output system. Similarly, colors on lines joining omax to the white and black vertices OW' and OK' of polyhedron opol' are mapped to colors on segments joining omax to the output white and black colors OW and OK.

Figure 10:
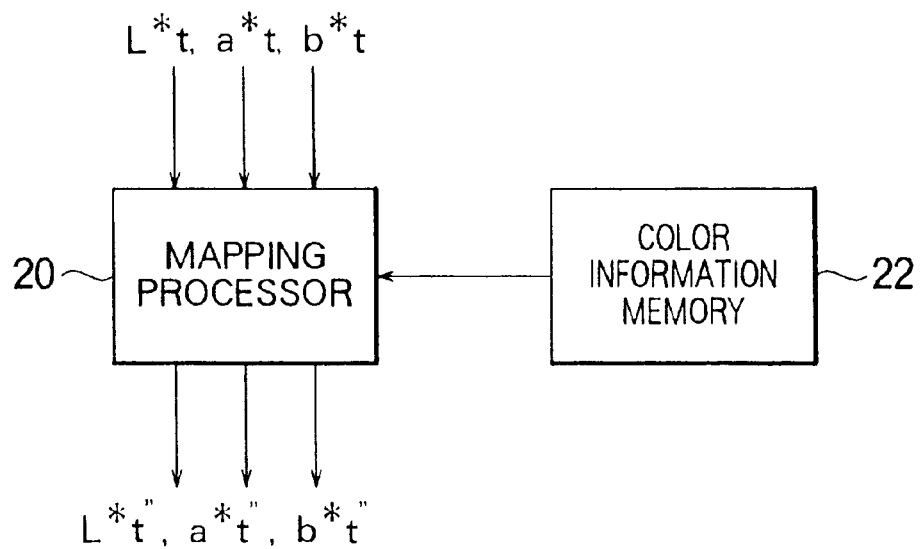
FIG. 10 illustrates the basic configuration of the apparatus used in the second embodiment.

FIG. 10 shows the general configuration of the mapping processor in the second embodiment, comprising a mapping processor 20 and a color information memory 22. The mapping processor 20 corresponds to the mapping processor 14 in FIG. 2, while the color information memory 22 is part of the color parameter memory in FIG. 2. The mapping processor 20 uses information supplied by the color information memory 22 to map an input color with coordinates (L*t, a*t, b*t) to an output color with coordinates (L*t", a*t", b*t").

Figure 11:
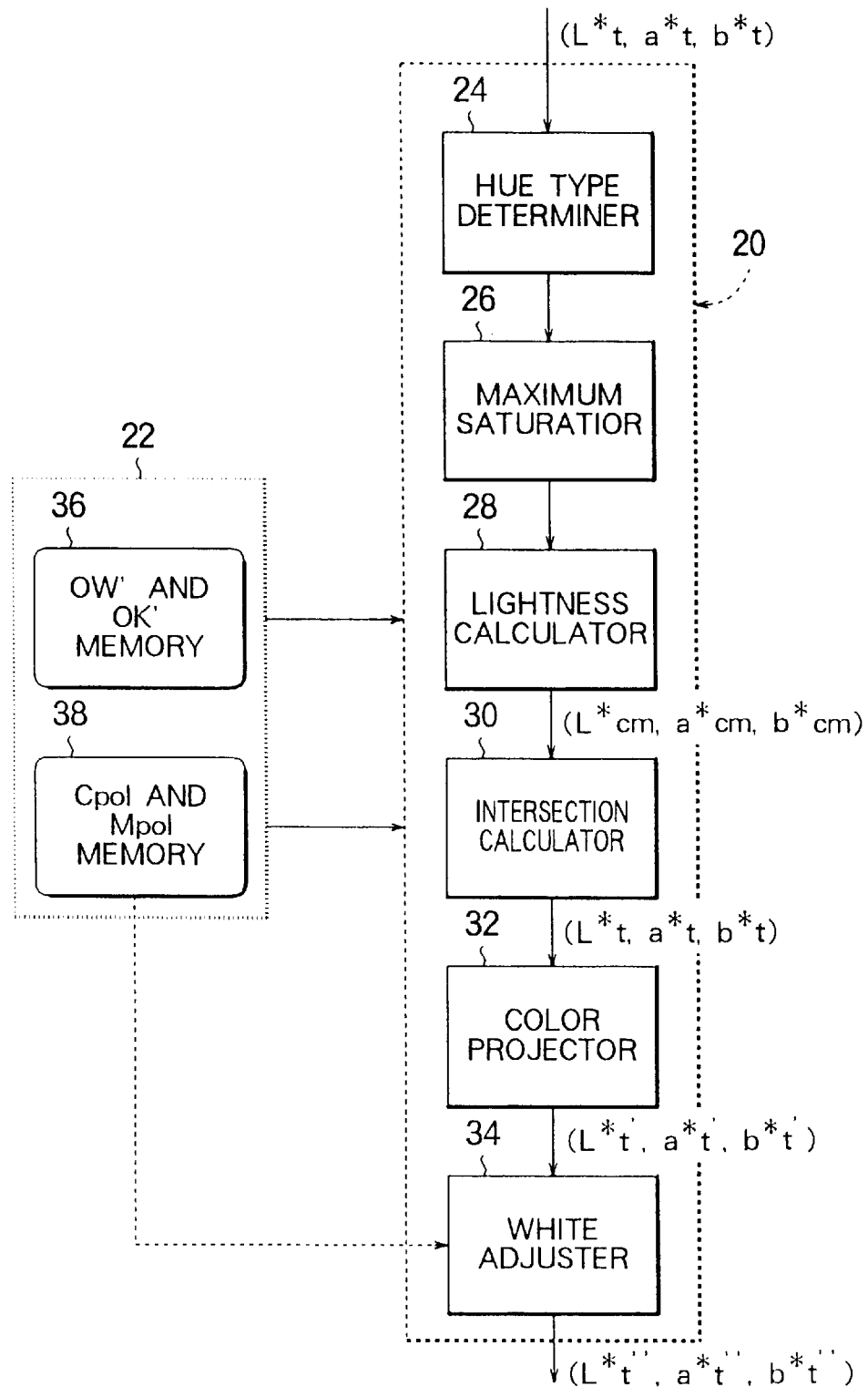
FIG. 11 illustrates the more detailed configuration of this apparatus.

FIG. 11 shows the more detailed configuration. The mapping processor 20 comprises a hue type determiner 24, a maximum saturator 26, a lightness calculator 28, an intersection calculator 30, a color projector 32, and a white adjuster 34. The color information memory 22 comprises an OW' and OK' memory 36 and a Cpol and Mpol memory 38. The OW' and OK' memory 36 stores the coordinates of the colors OW' and OK'. The Cpol and Mpol memory 38 stores the coordinates or the output white and black colors OW and OK, referred to below as Mpol information, and the coordinates of the most vivid colors C, B, M, R, Y, and G, referred to below as Cpol information.

Figure 12:
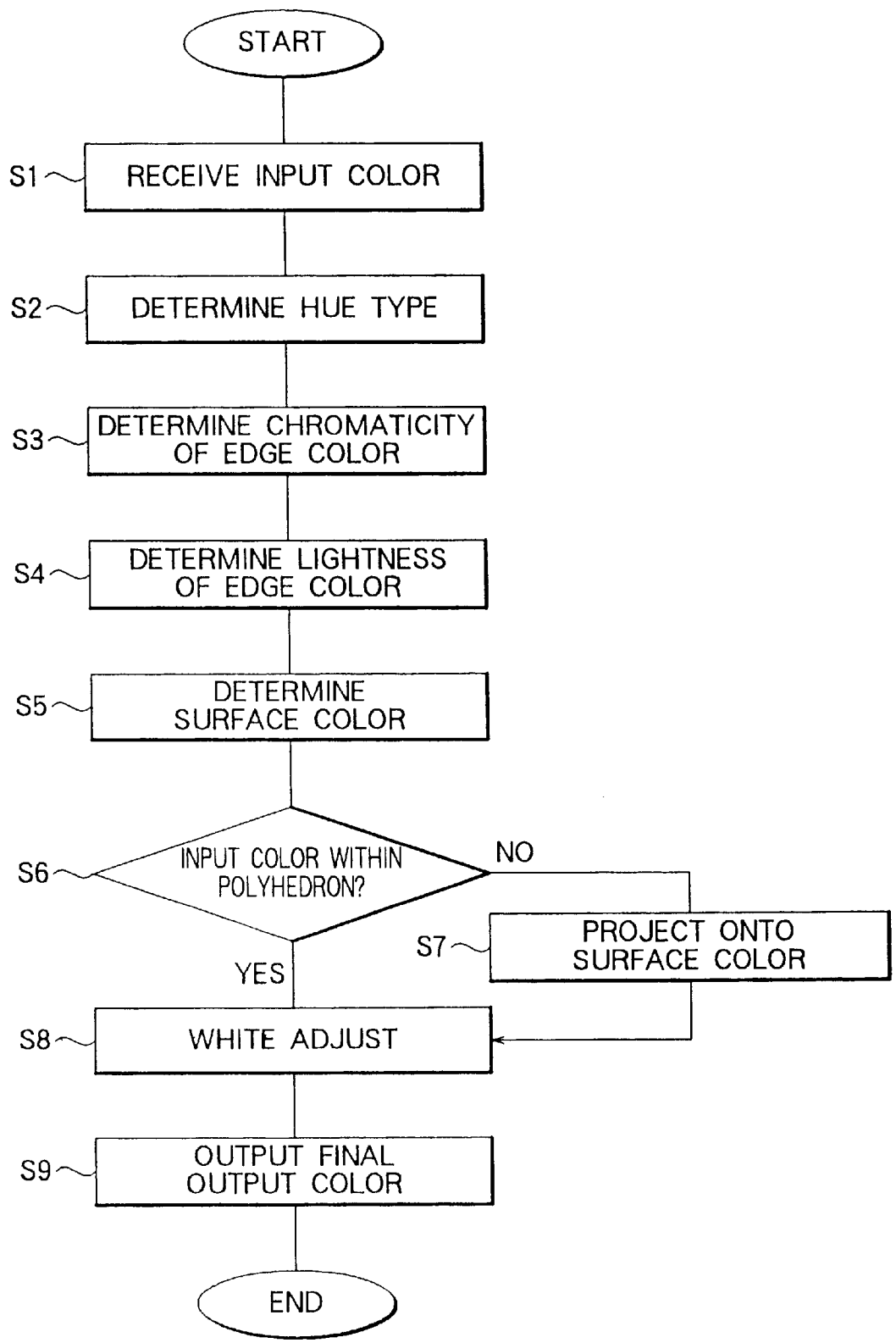
FIG. 12 is a flowchart describing the operation of the second embodiment.

Next, the operation of the second embodiment will be described, with reference to the flowchart in FIG. 12.

In step S1, the coordinates (L*t, a*t, b*t) of an input color T are received by the mapping processor 20.

Figure 13:
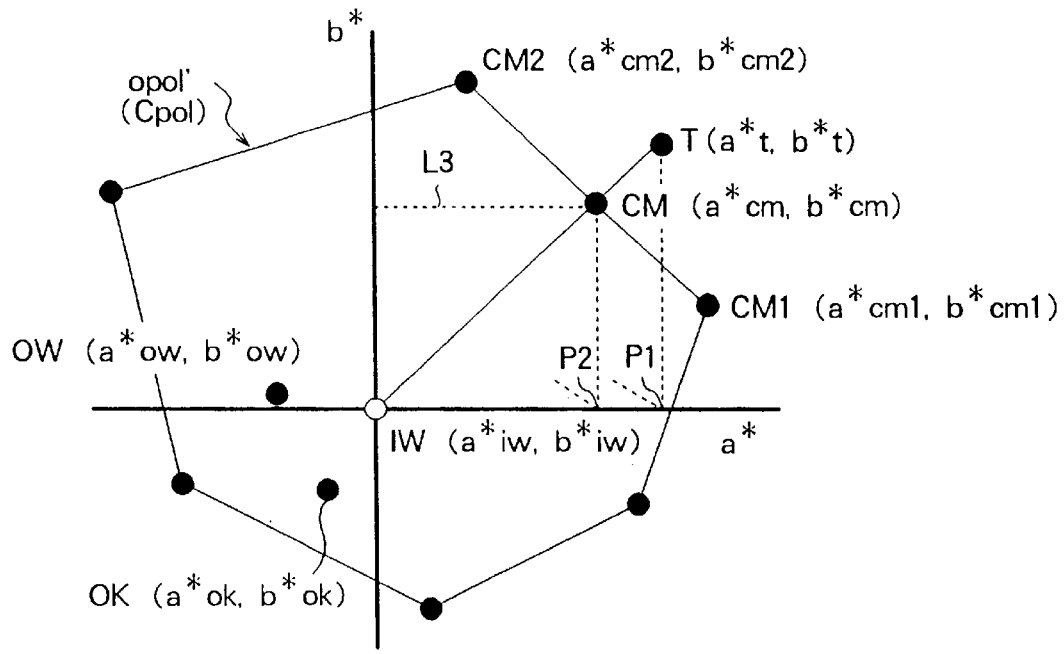
FIG. 13 shows the input color and second polyhedron viewed in the chromaticity plane.

In step S2, the hue type determiner 24 determines which vivid edge of polyhedron opol' includes a hue matching the hue of the input color T. Referring to FIG. 13, which shows polyhedron opol' projected on the chromaticity diagram in the a*b* plane to form the polygon Cpol, the hue type determiner 24 tests the chromaticity coordinates a*t and b*t and finds two adjacent color vertices CM1 and CM2 of opol' such that a line drawn from the input white axis through the input color T, when projected on the a*b* plane, passes between CM1 and CM2, also projected on the a*b* plane. The chromaticity coordinates of these vertices (a*cm1, b*cm1) and (a*cm2, b*cm2) are fetched from the Cpol and Mpol memory 38.

In step S3, the maximum saturator 26 finds the chromaticity coordinates of the most saturated color CM in polyhedron opol' having the same hue as the input color T. This color CM is disposed on the vivid edge CM1–CM2 of polyhedron opol'. When projected onto the chromaticity diagram in the a*b* plane, edge color CM is disposed on a line drawn from the input white axis through the input color T, and also on the line joining CM1 and CM2.

When projected onto the a*b* plane, line CM1–CM2 has the following equation.

$$b = \frac{b*cm2 - b*cm1}{a*cm2 - a*cm1} \times a + \frac{(b*cm2 - a*cm1) \times (b*cm2 - b*cm1)}{a*cm2 - a*cm1}$$

The line IW-T from the input white axis through T, when projected onto the a*b* plane, has the following equation.

$$b = \frac{b*t}{a*t} \times a$$

The chromaticity coordinates a*cm and b*cm of the edge color CM are found by using well-known methods to solve this pair of simultaneous equations for a and b.

The combined effect of the two steps S2 and S3 is to find the unique intersection of polygon Cpol with a line drawn from the white axis through the input color T, in projection on the a*b* plane.

Figure 14:
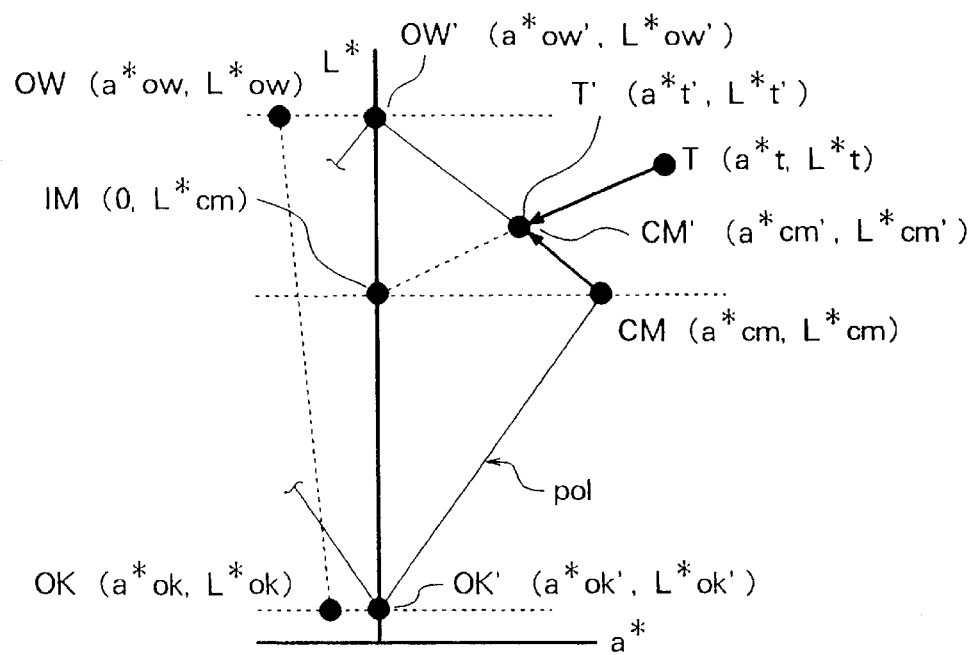
FIG. 14 shows the input color and second polyhedron viewed perpendicular to the chromaticity plane, and illustrates the color projection step.

In the next step S4, the lightness calculator 28 calculates the lightness coordinate L*cm of the edge color CM. This is a straightforward calculation using the lightness coordinates L*cm1 and L*cm2 of colors CM1 and CM2, and the ratio of a*cm1−a*cm to a*cm−a*cm2, or of b*cm1−b*cm to b*cm−b*cm2. This calculation also determines an input gray color IM on the input white axis, having a lightness value equal to the calculated lightness L*cm of the edge color CM, as illustrated in FIG. 14, which shows the L*a* plane.

In the next step S5, the intersection calculator 30 calculates the coordinates of a surface color CM' at the intersection of the surface of polyhedron opol' with a line drawn from the input gray color IM through the input color T. If T is lighter than color CM, then CM' is disposed at the intersection of the line from IM through T with a line joining CM and OW'. If T is darker than CM, then CM' is disposed at the intersection of the line from IM through T with a line joining CM and OK'. The L* and a* coordinates (L*cm' and a*cm') of the surface color CM' can be obtained by solving simultaneous equations to find the projection of CM' on the L*a* plane, as illustrated in FIG. 14. The b* coordinate can then be obtained from the following equation.

$$b \ast cm' = \frac{|a \ast cm'|}{|a \ast cm|} \times b \ast cm$$

In the next step S6, the color projector 32 decides whether the input color T is exterior to polyhedron opol'. If T is not exterior to polyhedron opol', the following conditions will all be true.

$$|L \ast t - L \ast cm| \leq |L \ast cm' - L \ast cm|$$

$$|a \ast t| \leq |a \ast cm'|$$

$$|b \ast t| \leq |b \ast cm'|$$

If these conditions are all true, the color projector 32 leaves the input color T where it is, because T already lies within polyhedron opol'. If any one of these is not true, then T is exterior to polyhedron opol', and in step S7 the color projector 32 projects T to the surface color CM'.

When T is exterior to polyhedron opol', projecting T onto CM' changes the lightness coordinate, but reduces the loss of saturation. If T were to be projected to a color on line CM-OW' having the same lightness as T in FIG. 14, this color would be nearly white. The color CM', although darker, is more vivid.

Figure 15:
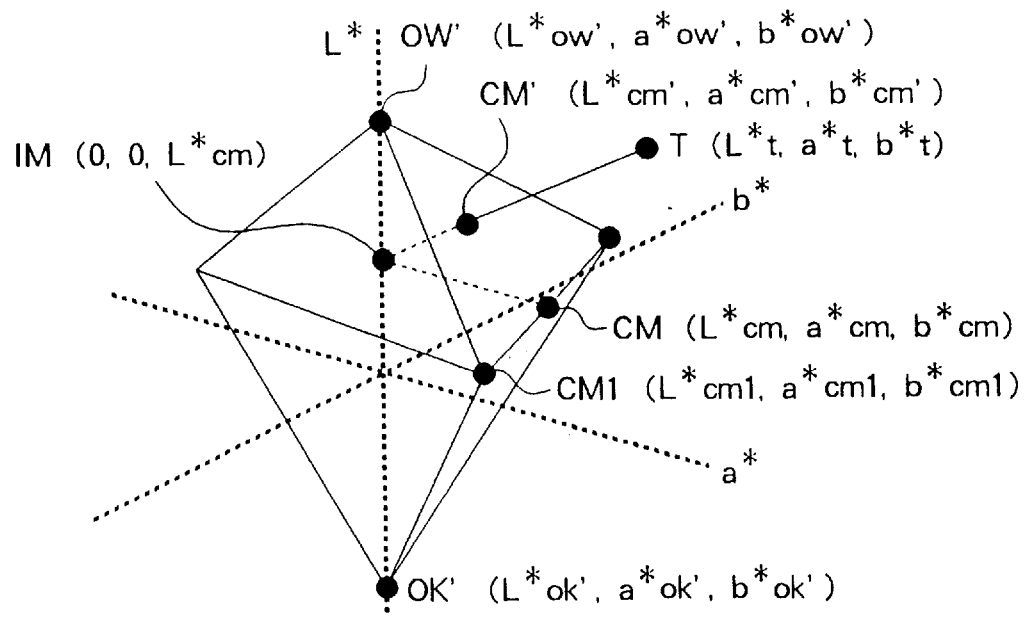
FIG. 15 shows a perspective view of the color projection step.

FIG. 15 shows step S7 in perspective view.

After steps S6 and S7, the input color T has been mapped onto an intermediate color T' with coordinates (L*t', a*t', b*t'). The intermediate color T' is equal to T if T is disposed within polyhedron opol', and is equal to the surface color CM' if T is exterior to polyhedron opol'.

In the next step S8, the white adjuster 34 performs a white adjustment that shifts the input white axis (line OW'-OK') to the output white axis (line OW-OK), so that the colors black, white, and gray in the input image will appear black, white, and gray in the output image.

First, the coordinates (L*om, a*om, b*om) of a color OM on the output white axis OW-OK are found, L*om being equal to the lightness coordinate of the color T'. Since L*om is known, the chromaticity coordinates a*om and b*om can be found by a ratio calculation involving the coordinates (L*ow, a*ow, b*ow) of the output white color OW, the coordinates (L*ok, a*ok, b*ok) of the output black color OK, and the ratio by which L*om divides the difference between L*ow and L*ok. The chromaticity coordinates (a*om, b*om) are used as a correction vector.

Next, the correction vector is multiplied by a factor k calculated as follows.

$$k = 1 - (|a \ast t'|/|a \ast cm'|)$$

If a*t' and a*cm' are both equal to zero, k is calculated as follows.

$$k = 1 - (|b \ast t'|/|b \ast cm'|)$$

If T' is on the input white axis, so that a*t and b*t are both equal to zero, then k is equal to unity.

The final output color T", output in step S9, has coordinates obtained by adding the correction vector, multiplied by k, to the coordinates of T'. Specifically, $$T'' = (L \ast t', a \ast t' + (a \ast om \times k), b \ast t' + (b \ast om \times k))$$

Figure 16:
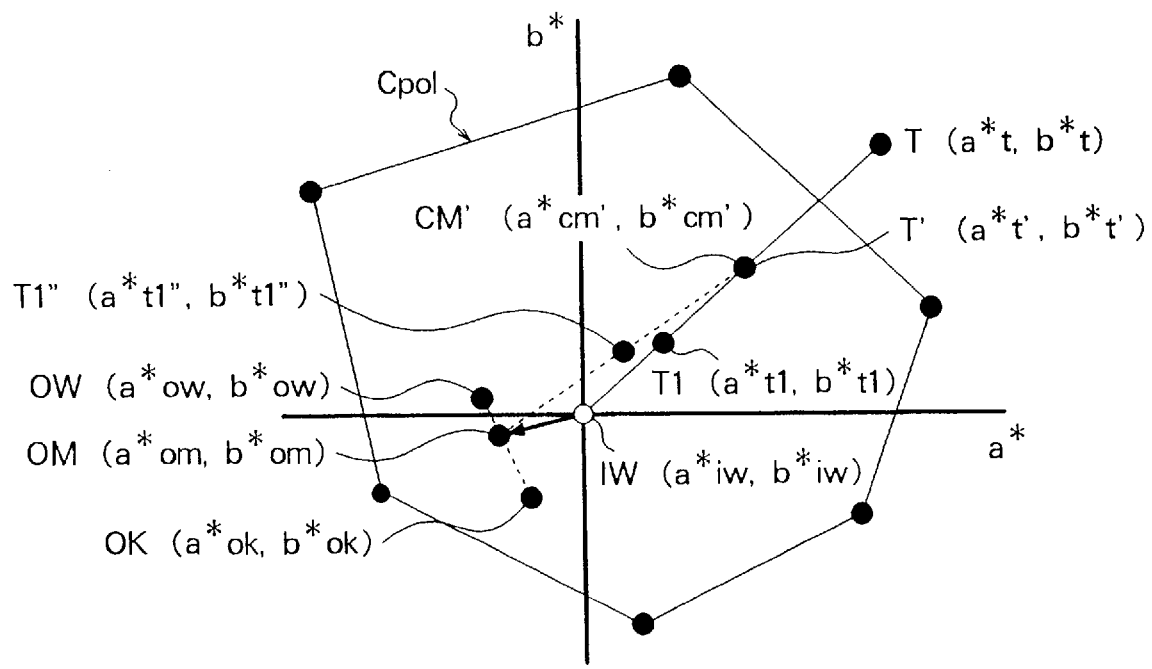
FIG. 16 shows the input color and second polyhedron viewed in the chromaticity plane, and illustrates the white adjustment process.

FIG. 16 illustrates several cases of this white adjustment, as viewed in the a*b* plane.

If T' is disposed on the surface of polyhedron opol', then that T'=CM', so k is equal to zero, and the output color T" is equal to T'. For example, if the input color T was exterior to polyhedron opol', then the output color T" is equal to T', both being equal to the surface color CM'.

If T' is disposed on the input white axis (IW in FIG. 16), then k is equal to unity, and T" has coordinates (L*t', a*om, b*om) equal to (L*om, a*om, b*om). T" is therefore disposed on the output white axis.

If T' is disposed between the input white axis and the surface of polyhedron opol', then k has a value between zero and one. This case is illustrated by the color T1 with chromaticity coordinates (a*t1, b*t1) in FIG. 16, which is adjusted to a color T1" with coordinates (a*t1", b*t1").

In both the color projection process and the white adjustment process, the second embodiment gives priority to the most vivid reproducible output colors, as approximated by the cyan, blue, magenta, red, yellow, and green vertices of polyhedron opol', and other edge colors on the vivid edges joining adjacent pairs of these vertices. During color projection, colors equal in lightness and hue to these vivid edge colors, but having greater saturation, are projected onto these vivid edge colors, rather than being projected onto less vivid colors. Other colors exterior to polyhedron opol' are projected toward input gray colors having the same lightness as these vivid edge colors, thereby reducing the loss of saturation. During white adjustment, the vivid edge colors, and other vivid colors on the surface of polyhedron opol', are left unmoved. The color mapping process accordingly preserves most of the vividness of the original image.

Another advantage of the second embodiment is the use or a polyhedral approximation with only eight vertices, reducing the amount of color parameter information that must be stored and simplifying the computations.

Still another advantage is that the white adjustment prevents colorless areas in the input image from becoming tinged with color in the output image.

The second embodiment is not restricted to the specific computational procedures shown above. Referring again to FIG. 15, the color projection calculations can also be performed, for example, as follows.

The general equation of a plane in the L*a*b* color space has the following form:

$$CL^* + Aa^* + Bb^* + D = 0$$

For the plane defined by points OW', CM1, and CM2, the values of A, B, C, and D are given as follows.

$$A = (b^*cm2 - b^*cm1)(L^*ow' - L^*cm1) - (L^*cm2 - L^*cm1)(b^*ow' - b^*cm1)$$

$$B = (L^*cm2 - L^*cm1)(a^*ow' - a^*cm1) - (a^*cm2 - a^*cm1)(L^*ow' - L^*cm1)$$

$$C = (a^*cm2 - a^*cm1)(b^*ow' - b^*cm1) - (b^*cm2 - b^*cm1)(a^*ow' - a^*cm1)$$

$$D = (a*ow' - a*cm1)(L*cm1 \cdot b*cm2 - b*cm1 \cdot L*cm2) +$$
$$(b*ow' - b*cm1)(a*cm1 \cdot L*cm2 - L*cm1 \cdot a*cm2) +$$
$$(L*ow' - L*cm1)(b*cm1 \cdot a*cm2 - a*cm1 \cdot b*cm2)$$

The general equation for a line passing through a point (x, y, z) in a direction defined by parameters l, m, and n can be written as follows.

$$(a^* - x)/l = (b^* - y)/m = (L^* - z)/n$$

For the line from IM through T, the values of x, y, z, l, m, and n are as follows.

$$x = 0$$
$$y = 0$$
$$z = L^*cm$$
$$l = a^*t - a^*cm$$
$$m = b^*t - b^*cm$$
$$n = L^*t - L^*cm$$

This line intersects the above plane at a point CM' with coordinates (L*cm', a*cm', b*cm') having the following values.

$$a^*cm' = x - l \cdot p$$
$$b^*cm' = y - m \cdot p$$
$$L^*cm' = z - n \cdot p$$
$$p = (A \cdot x + B \cdot y + C \cdot z + D)/(A \cdot l + B \cdot m + C \cdot n)$$

If the input color T is closer to black than to white, the intersection of line IM-T with the plane defined by OK', CM1, and CM2 can be calculated in the same way.

The second embodiment is not limited to the use of the CIE LAB coordinate system. Similar calculations can be performed in the CIE Yxy coordinate system.

Next, the operation of the second embodiment at medium and high lightness levels will be evaluated.

Figure 17:
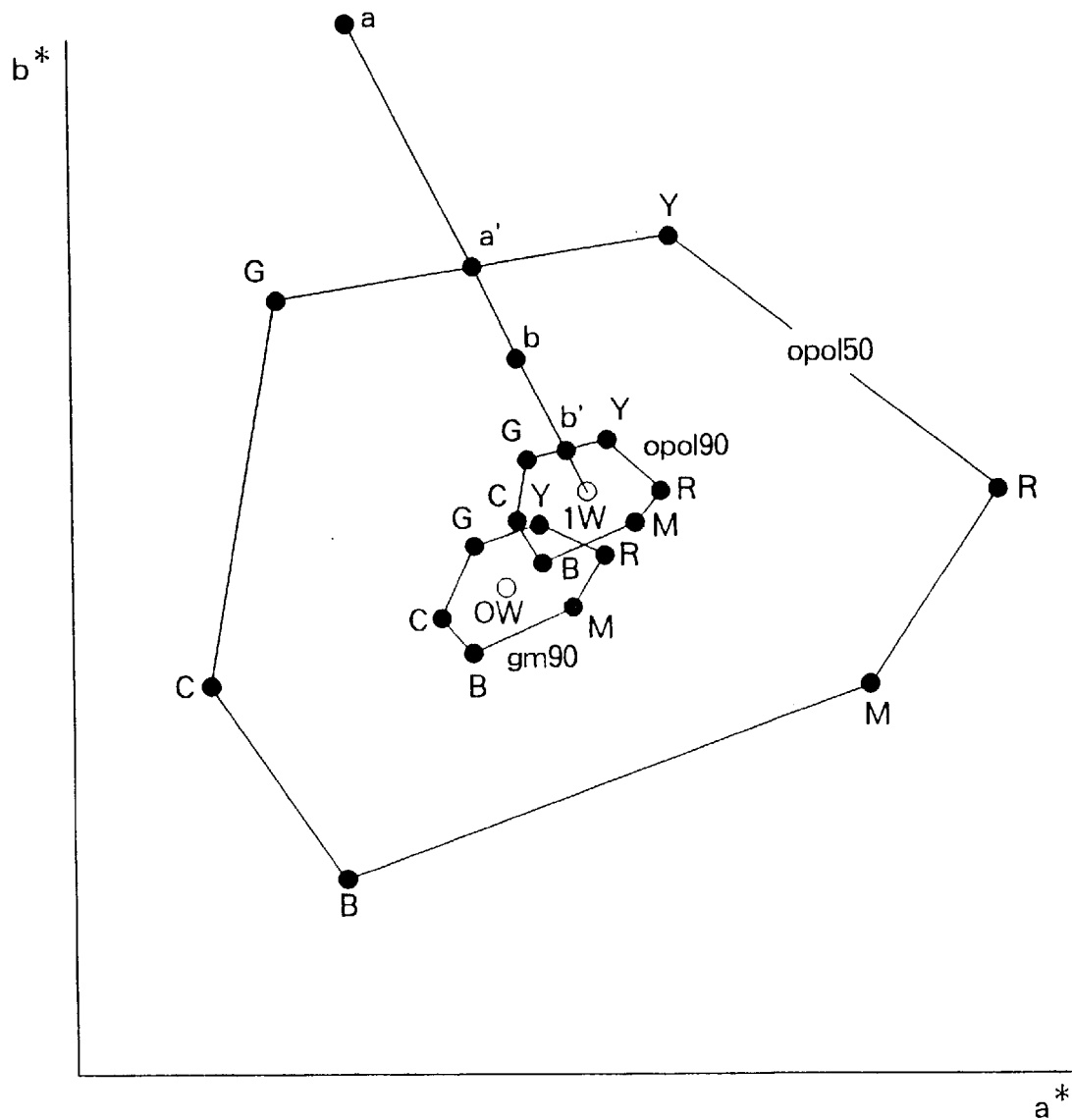
FIG. 17 illustrates the operation of the second embodiment at medium and high lightness levels.

FIG. 17 shows a view looking down onto the a*b* plane in the CIE LAB coordinate system. The letters C, B, M, R, Y, and G indicate shades of cyan, blue, magenta, red, yellow, and green in the input and output color spaces, while IW and OW are the input and output white colors, respectively. The polygons marked opol'50 and opol'90 are sections through the second polyhedron (opol') at the 50% lightness level and 90% lightness levels, respectively. The polygon marked gm90 approximates the gamut of reproducible output colors with a lightness level of 90%, centered around the output white color (OW).

The second embodiment projects a certain highly saturated shade of yellow-green (a) onto a less saturated color (a') on polygon opol'50. In the subsequent white adjustment, since a' is disposed on the surface of polyhedron opol', a' remains fixed. At the 50% lightness level, opol' is a good approximation to the actual gamut of colors reproducible in the output system, and a' is a desirable output color.

A much lighter shade of yellow-green (b), however, is projected onto a color (b') on polygon opol'90. Since b' is also disposed on the surface of polyhedron opol', b' remains fixed in the subsequent white adjustment, even though b' lies outside the gamut of colors, approximated by polygon gm90, that the output system can actually reproduce at a lightness level of 90%.

Light blue input colors projected onto the blue point (B) on polygon opol'90 also remain fixed during the white adjustment, and are thus reproduced as shades of orange in the output color space.

Accordingly, although the second embodiment performs excellently in preserving the vividness of colors at medium lightness levels, color distortions may still occur at high lightness levels. Distortions may also occur at low lightness levels, although they are less likely to be noticed.

The second embodiment can accordingly be varied by having the white adjuster 34 map the entire polygon opol'90 onto the polygon gm90 in a hue-preserving manner, points on the perimeter of polygon opol'90 being mapped to corresponding points on the perimeter of polygon gm90, and interior points in opol'90 being mapped to interior points in gm90. Polygon gm90 can be determined from the output polyhedron 6 shown in FIG. 1, by taking a section through this polyhedron 6 at the 90% lightness level.

Figure 18:
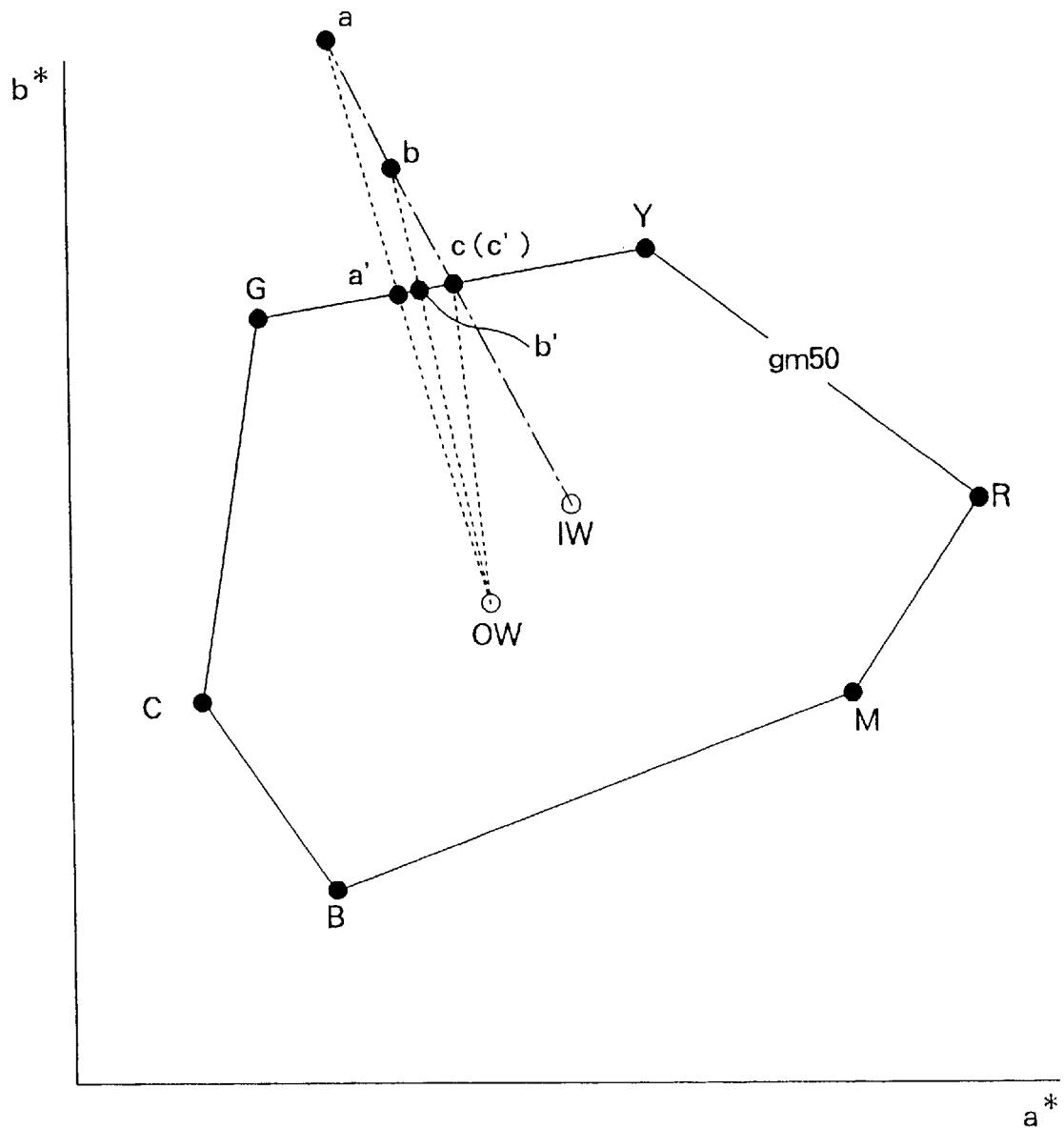
FIG. 18 illustrates an alternative type of color projection.

Another possible variation is to project colors toward the output white axis instead of the input white axis, as shown in FIG. 18. In this type of projection, however, three points (a, b, and c) having the same hue in the input color space are projected onto points (a', b', and c') having different hues in the output color space, again introducing a color distortion. This variation is not preferred.

Third Embodiment

The third embodiment will employ the CIE Yxy color coordinate system, with all colors on the input white axis assumed to have the same chromaticity coordinates. The scaling process described in the first embodiment is assumed to have been already performed.

Figure 19:
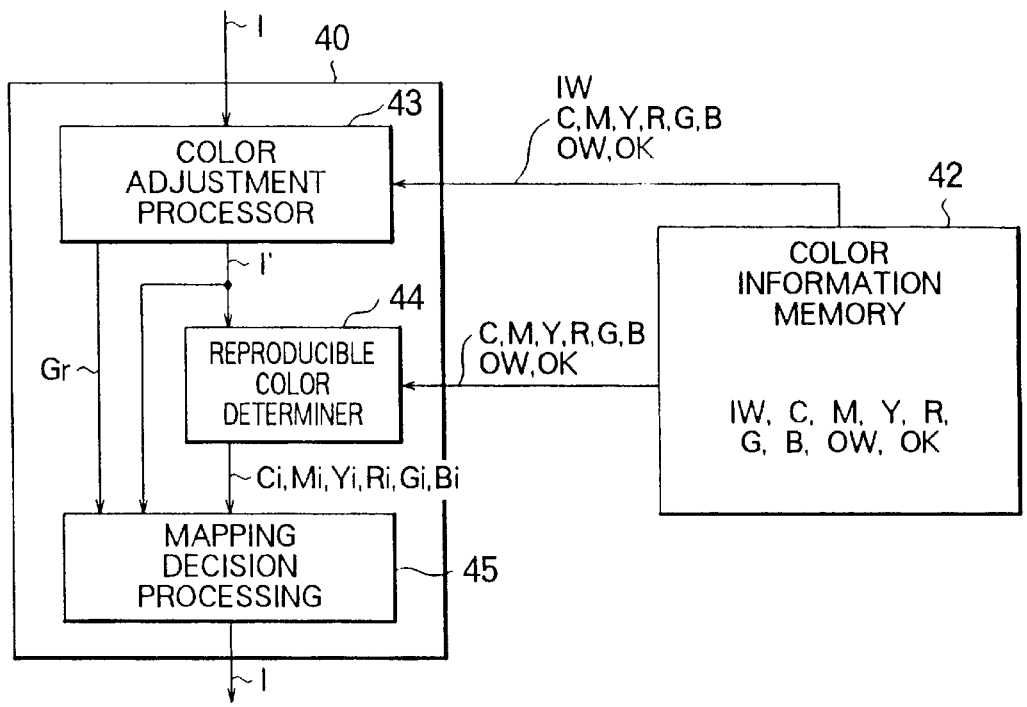
FIG. 19 shows the general configuration of an apparatus used in a third embodiment of the invention.

Referring to FIG. 19, the third embodiment comprises a mapping processor 40 and a color information memory 42. The mapping processor 40 is equivalent to the mapping processor 14 in FIG. 2. The color information memory 42 is part of the color parameter memory 8 in FIG. 2. The mapping processor 40 comprises a color adjustment processor 43, a reproducible color determiner 44, and a mapping decision processor 45.

The color information memory 42 stores the color coordinates of a plurality of colors, each of which is the most vivid color that the output system can reproduce at a given hue. In the present embodiment these colors will again be cyan (C), blue (B), magenta (M), red (R), yellow (Y), and green (C). Also stored in the color information memory 42 are the coordinates of the output white color (OW), the coordinates of the output black color (OK), and the coordinates of the input white point (IW).

Figure 20:
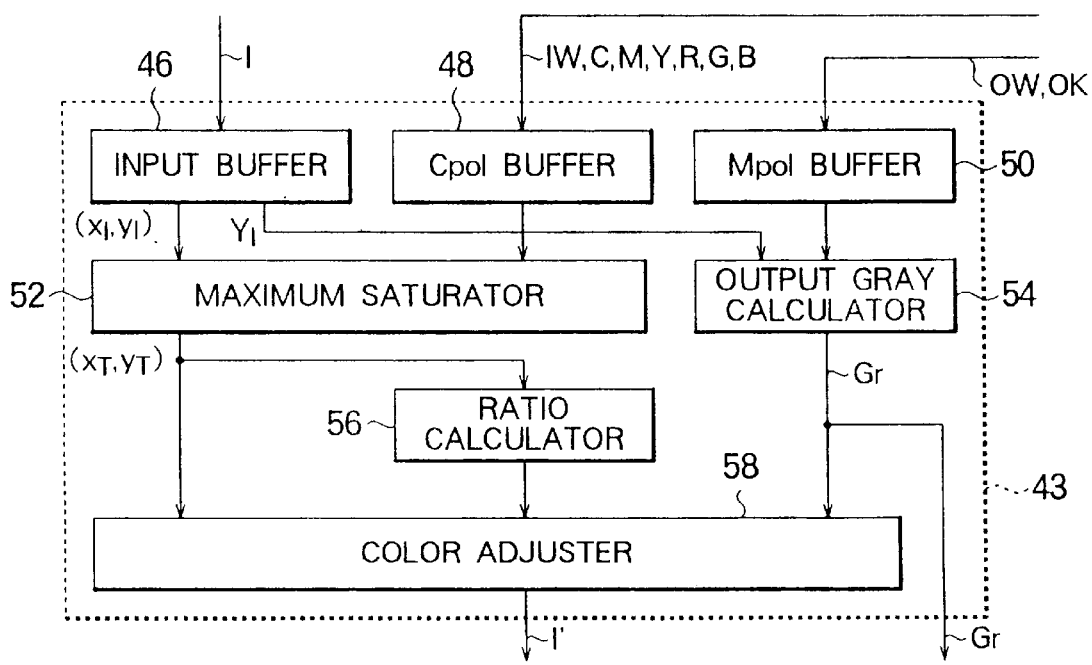
FIG. 20 shows the structure of the color adjustment processor in FIG. 19.

Referring to FIG. 20, the color adjustment processor 43 comprises an input buffer 46, a Cpol buffer 48, an Mpol buffer 50, a maximum saturator 52, an output gray calculator 54, a ratio calculator 56, and a color adjuster 58.

Figure 21:
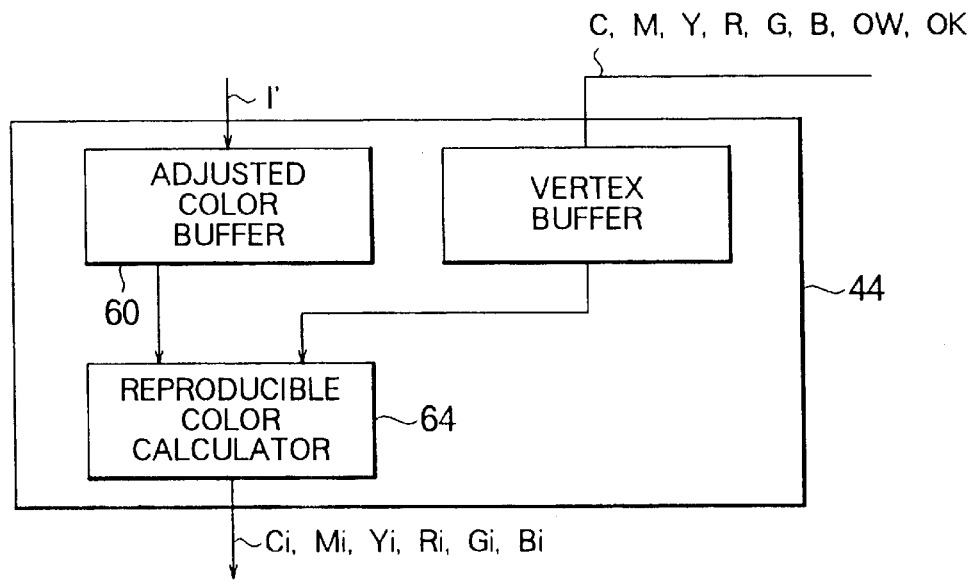
FIG. 21 shows the structure of the reproducible color determiner in FIG. 19.

Referring to FIG. 21, the reproducible color determiner 44 comprises an adjusted color buffer 60, a vertex buffer 62, and a reproducible color calculator 64.

Figure 22:
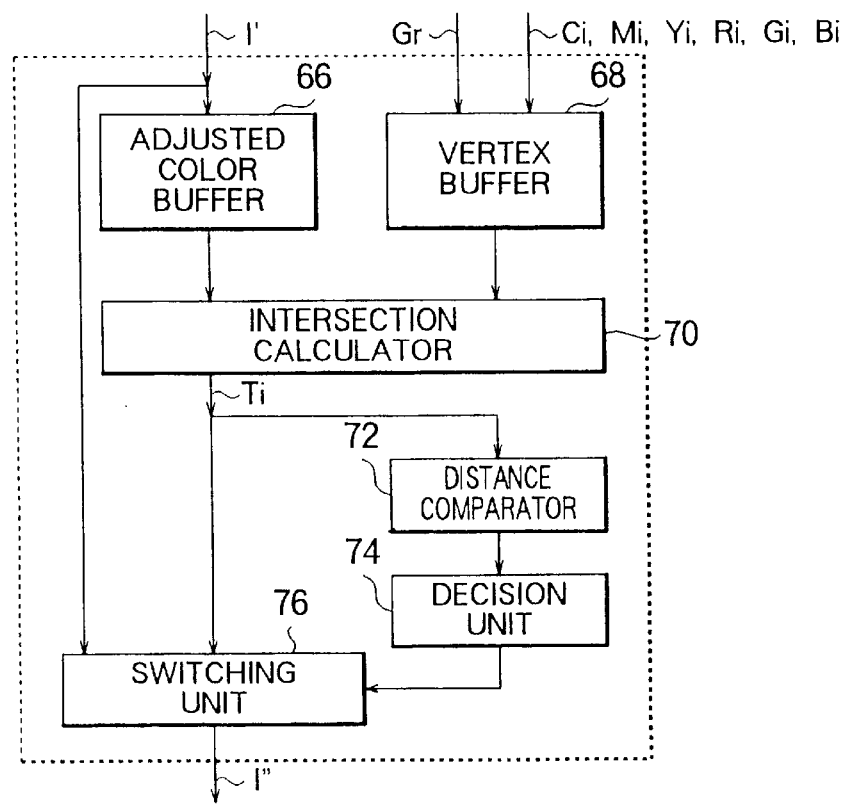
FIG. 22 shows the structure of the mapping decision processor in FIG. 19.

Referring to FIG. 22, the mapping decision processor 45 comprises an adjusted color buffer 66, a reproducible color buffer 68, an intersection calculator 70, a distance comparator 72, a decision unit 74, and a switching unit 76.

Next, the operation of the third embodiment will be described.

Before the operation begins, the coordinates of the most vivid colors (cyan, blue, magenta, red, yellow, and green) at the vertices of the output polyhedron opol, and the coordinates of the input white color (IW), are read from the color information memory 42 and stored in the Cpol buffer 48 in the color adjustment processor 43. The coordinates of the output white color (OW) and output black color (OK) are read from the color information memory 42, and stored in the Mpol buffer 50. The coordinates of the most vivid colors (cyan, blue, magenta, red, yellow, and green) and the coordinates of the output white (OW) and black (OK) colors are also stored in the vertex buffer 62 in the reproducible color determiner 44.

Figure 23:
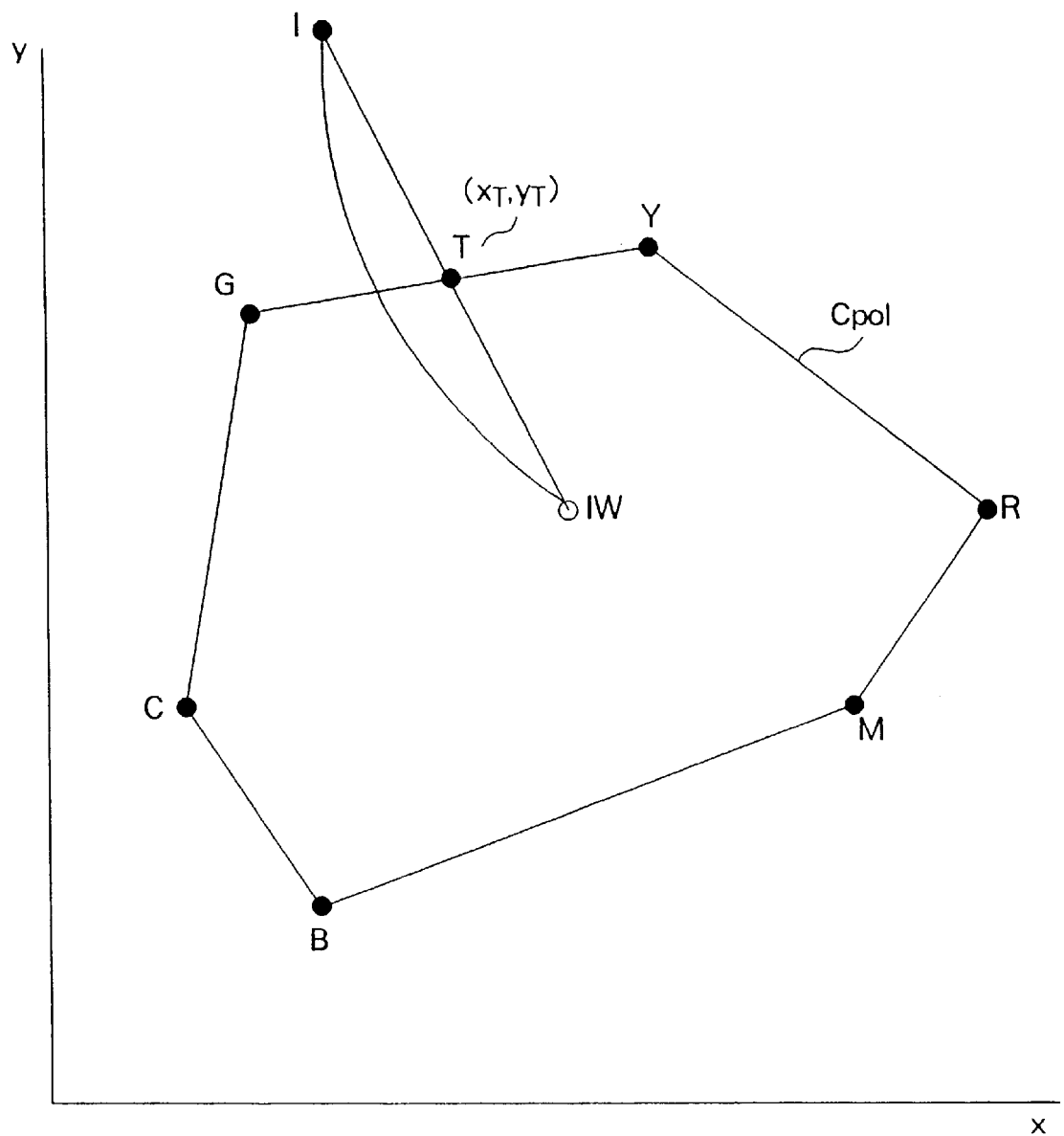
FIG. 23 shows an input color I and a polygon of most vivid colors viewed in the chromaticity plane in the third embodiment.

The input buffer 46 in the color adjustment processor 43 receives and stores the color coordinates of an input color I ($Y_I$, $x_I$, $y_I$). FIG. 23 shows this input color I, together with the most vivid colors (C, B, M, R, Y, and G) and the input white color (IW), projected onto a chromaticity diagram in the xy plane. Combining the functions of the hue type determiner 24 and maximum saturator 26 in the second embodiment, the maximum saturator 52 determines the chromaticity coordinates ($x_T$ and $y_T$) of the intersection T of a line drawn from IW through I in the chromaticity diagram with the polygon Cpol defined by C, B, M, R, Y, and G. In the example shown in FIG. 23, the maximum saturator 52 determines that the hue of the input color I lies between the hues of the most vivid yellow (Y) and green (C) colors, and solves the following simultaneous equations, the first being the equation of line IW-I and the second being the equation of line G-Y.

$$y_T = \frac{y_I - Y_{IW}}{x_I - x_{IW}} x_T + \frac{x_I y_{IW} - x_{IW} y_I}{x_I - x_{IW}}$$

$$y_T = \frac{y_G - y_Y}{x_G - x_Y} x_T + \frac{x_G y_Y - x_Y y_G}{x_G - x_Y}$$

These coordinates $x_T$ and $y_T$ are output to the ratio calculator 56 and color adjuster 58. The ratio calculator 56 determines the ratio of the distance from IW to I to the distance from IW to T.

Using the coordinates of the output white and black points, which are supplied by the Mpol buffer 50, the output gray calculator 54 determines the color coordinates of a gray color Gr on the output white axis having the same lightness as the input color I. The coordinates ($x_{Gr}$, $y_{Gr}$) of this gray color are given by the following equations.

$$x_{Gr} = \frac{Y_I - Y_{OK}}{Y_{OW} - Y_{OK}} (x_{OW} - x_{OK}) + x_{OK}$$

$$y_{Gr} = \frac{Y_I - Y_{OK}}{Y_{OW} - Y_{OK}} (y_{OW} - y_{OK}) + y_{OK}$$

Figure 24:
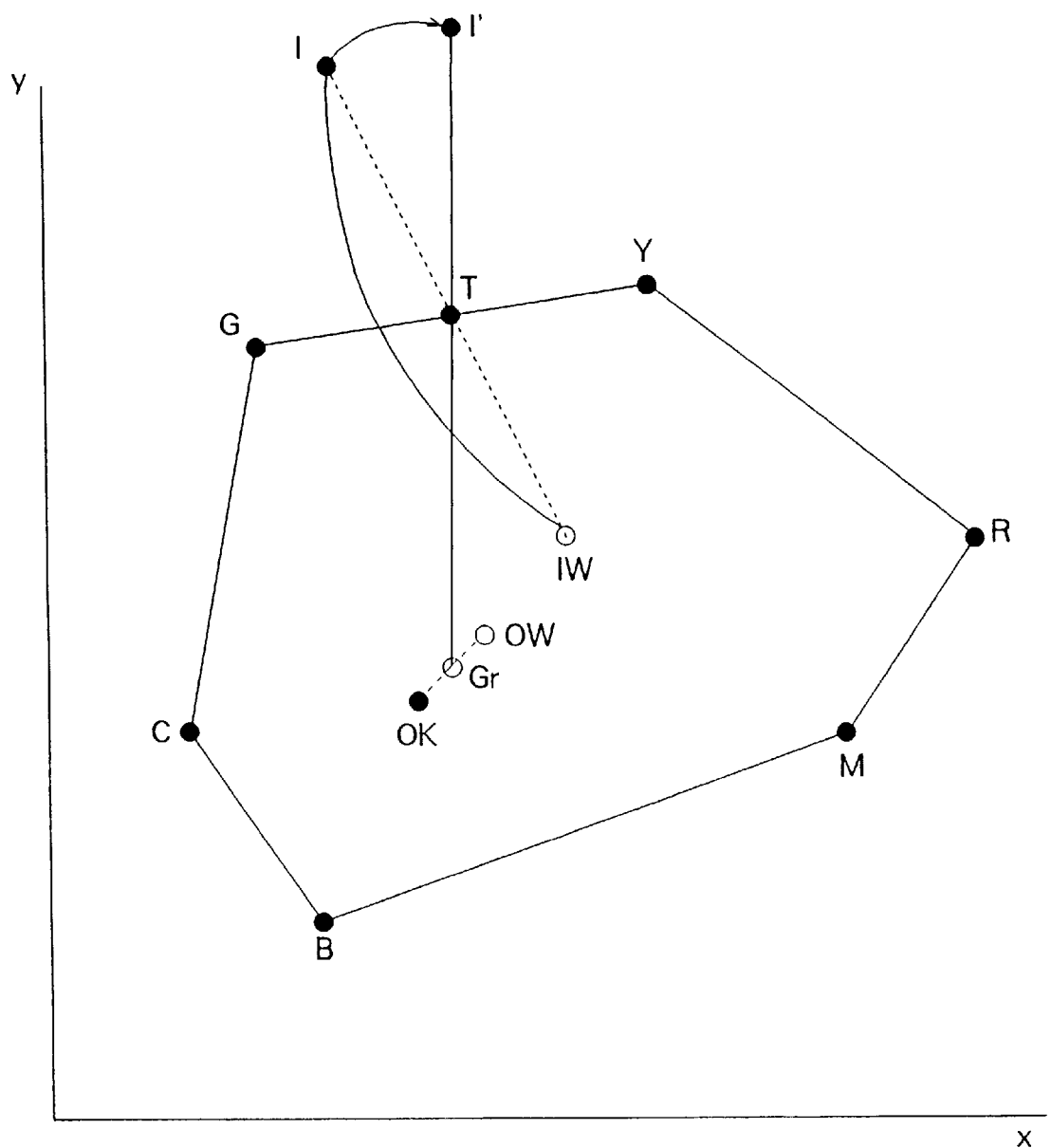
FIG. 24 illustrates a color adjustment process performed in the third embodiment as seen in the chromaticity plane.
Figure 25:
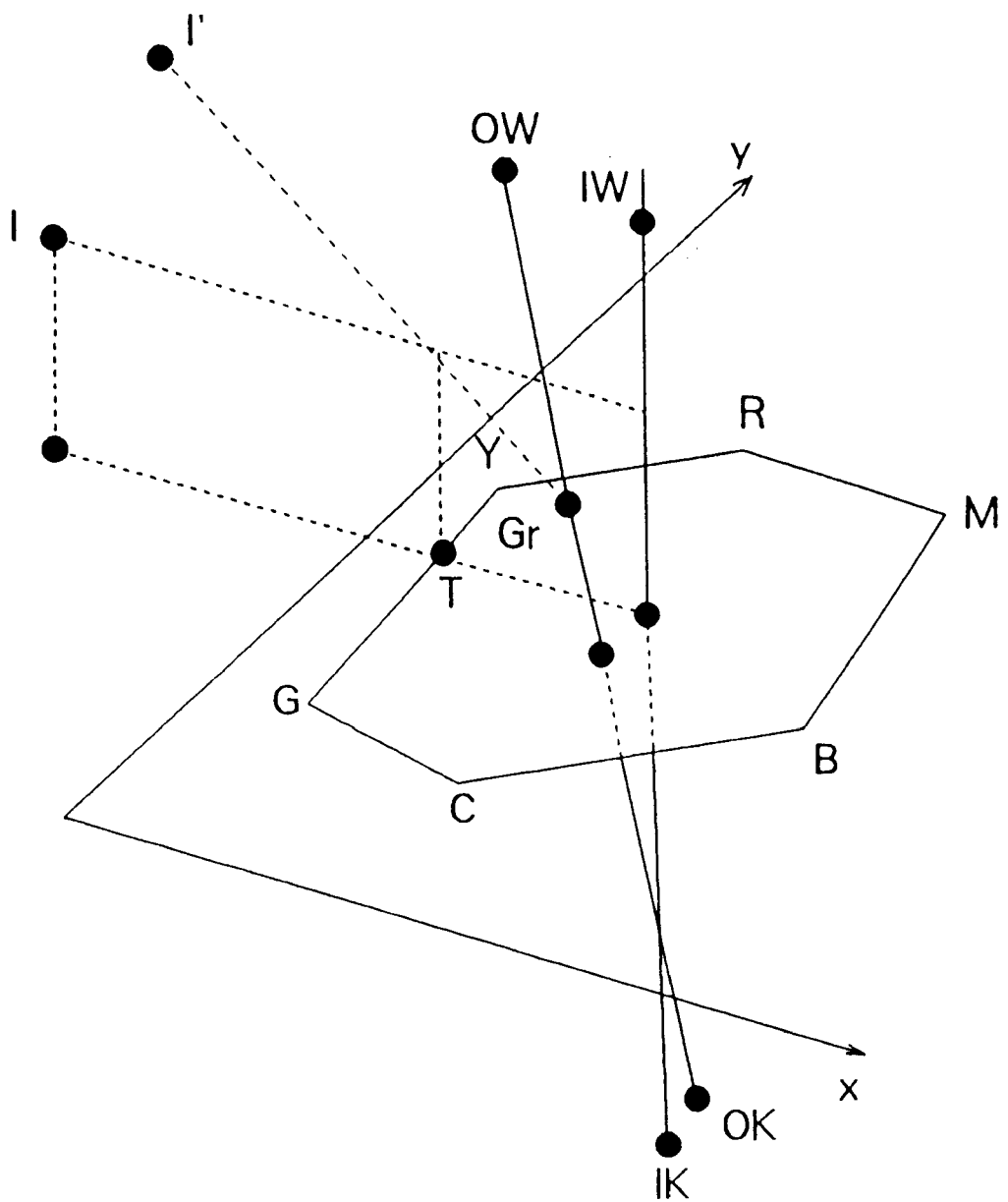
FIG. 25 shows a perspective view of the color adjustment process in the third embodiment.

The color adjuster 58 uses the above results to calculate the coordinates ($Y_I'$, $x_I'$, $y_I'$) of an adjusted color I'. The lightness coordinate $Y_I'$ of this color I' is the same as the lightness coordinate $Y_I$ of the input color I. Referring to FIG. 24, the x- and y-coordinates $x_I'$ and $y_I'$ of the adjusted color I' are calculated by finding an adjusted point (also denoted I' in FIG. 24) on a line drawn from the output gray color Gr through the intersection T in the chromaticity diagram, such that the distances Gr-T and Gr-I' are in equal ratio to the distances IW-T and IW-I; that is, (Gr-T):(Gr-I')=(IW-T):(IW-I). Accordingly, the color adjuster 58 subtracts the chromaticity coordinates of Gr from the chromaticity coordinates of T to obtain a vector quantity, multiplies this vector quantity by the distance ratio of IW-I to IW-T, which was determined by the ratio calculator 56, and adds the product vector to Gr. FIG. 25 illustrates this process three-dimensionally.

The coordinates of the adjusted color I' are placed in the adjusted color buffers 60 and 66 in the reproducible color determiner 44 and mapping decision processor 45.

The reproducible color calculator 64 in the reproducible color determiner 44 uses the color coordinates of the most vivid colors (C, B, M, R, Y, and G) and the output white and black colors (OW and OK), which are stored in the vertex buffer 62, and the lightness coordinate $Y_I'$ of the adjusted input point, stored in the adjusted color buffer 60, to determine the coordinates of colors (Ci, Bi, Mi, Ri, Yi, and Gi) that the output system can most vividly reproduce at the lightness level $Y_I'$. This can be done by a ratio calculation. The color Gi, for example, lies on the segment joining G to OW if $Y_I'$ is lighter than G, and on the segment joining G to OK if $Y_I'$ is darker than C. If $Y_I'$ is lighter than G, the x-coordinate of Gi ($x_{Gi}$) is given by the following equation.

$$x_{Gi} = (x_{OW} - x_G) \frac{Y_I' - Y_G}{Y_{OW} - Y_G} + x_G$$

If $Y_I'$ is darker than G, then $x_{Gi}$ is given by the following equation.

$$x_{Gi} = (x_G - x_{OK}) \frac{Y_G - Y_I'}{Y_G - Y_{OK}} + x_{OK}$$

The y-coordinate of Gi ($y_{Gi}$), and the coordinates of the other colors (Ci, Bi, Mi, Ri, Yi) are found in the same way.

Figure 26:
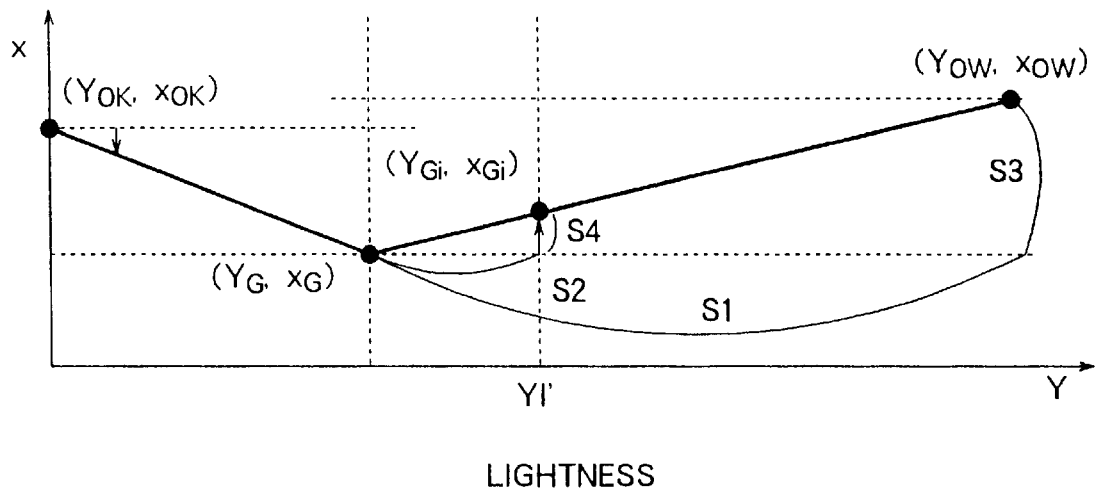
FIGS. 26 and 27 illustrate the calculations of coordinates of reproducible colors by means of ratios in the third embodiment.
Figure 27:
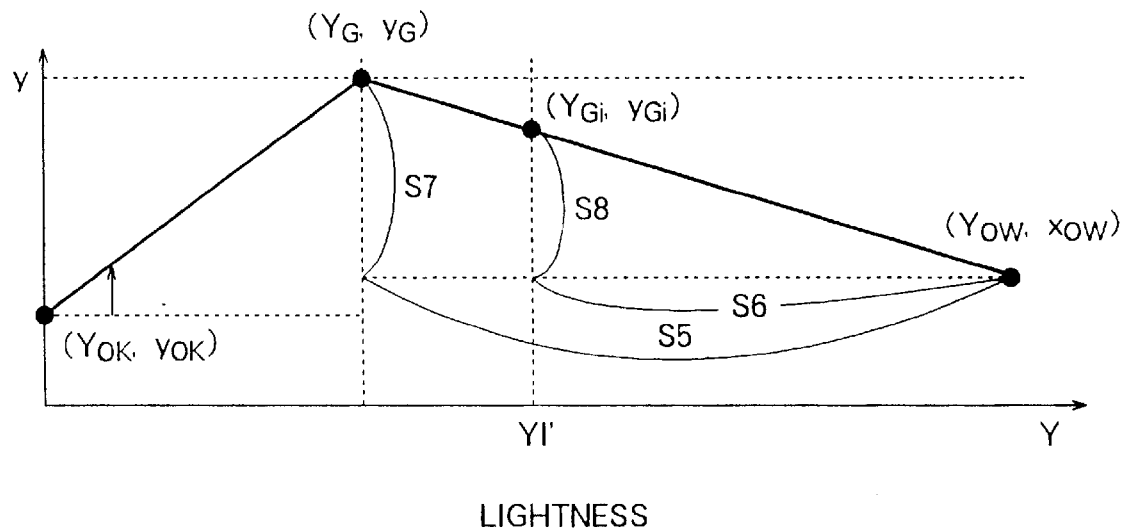

FIGS. 26 and 27 illustrate these calculations geometrically. In FIG. 26, the horizontal axis is the lightness axis and the vertical axis is the x-axis. The coordinate $x_{Gi}$ is found from the known value of $Y_I'$ and the coordinates of G ($Y_G$, $x_G$) and OW ($Y_{OW}$, $x_{OW}$), by use of the ratio condition S4:S2=S3:S1. In FIG. 27, the horizontal axis is the lightness axis and the vertical axis is the y-axis. The coordinate $y_{Gi}$ is found from the ratio condition S8:S7=S6:S5.

Figure 28:
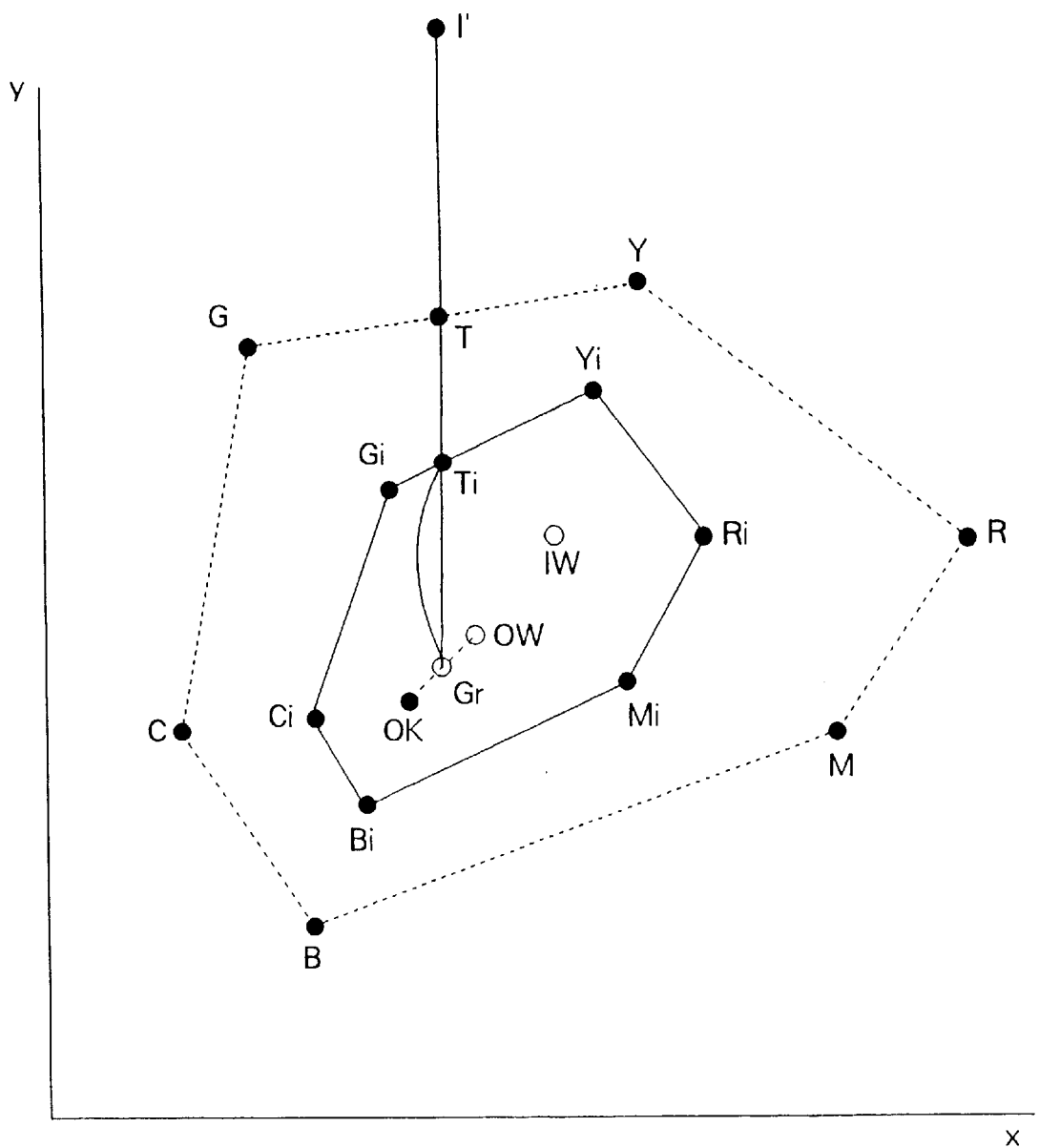
FIG. 28 illustrates a color projection process performed in the third embodiment, seen in the chromaticity plane.

In the mapping decision processor 45, the reproducible color buffer 68 receives and stores the coordinates of the output gray color Gr found the output gray calculator 54, and the colors Ci, Bi, Mi, Ri, Yi, and Gi found by the reproducible color calculator 64. The operation of the mapping decision processor 45 is illustrated in FIG. 28, which shows Cis, Bi, Mi, Ri, Yi, Gi, and Gr projected onto a chromaticity diagram in the xy plane, together with projections of the most vivid colors (C, B, M, R, Y, and G), the input white color (IW), and the output white and black colors (OW and OK).

The intersection calculator 70 finds the intersection Ti of the polygon CiBiMiRiYiGi with a line drawn from the output gray color Gr through the adjusted color I', in the same way that the intersection T was found earlier. In FIG. 28, the intersection calculator 70 determines that the line from Gr through I' intersects the segment joining Gi and Yi, then solves the following simultaneous equations.

$$y_{Ti} = \frac{y_I' - Y_{Gr}}{x_I' - x_{Gr}} x_{Ti} + \frac{x_I' y_{Gr} - x_{Gr} y_I'}{x_I' - x_{Gr}}$$

$$y_{Ti} = \frac{y_{Gi} - y_{Yi}}{x_{Gi} - x_{Yi}} x_{Ti} + \frac{x_{Gi} y_{Yi} - x_{Yi} y_{Gi}}{x_{Gi} - x_{Yi}}$$

The distance comparator 72 then compares the distance from Gr to I' with the distance from Gr to Ti in FIG. 28, and the decision unit 74 controls the switching unit 76 according to the result of the comparison. If the adjusted color I' is farther than Ti is from the output gray color Gr, then I' is not reproducible, so the decision unit 74 causes the switching unit 76 to use the chromaticity coordinates of Ti as the chromaticity coordinates of the output color I". This occurs when the following condition is true.

Distance Gr-I'>distance Gr-Ti

If distance Gr-I' does not exceed distance Gr-Ti, the decision unit 74 causes the switching unit 76 to use the chromaticity coordinates of the adjusted color I' as the chromaticity coordinates of the output color I". In either case, the lightness coordinate of the output color I" is the same as the lightness coordinate of the input color I.

Figure 29:
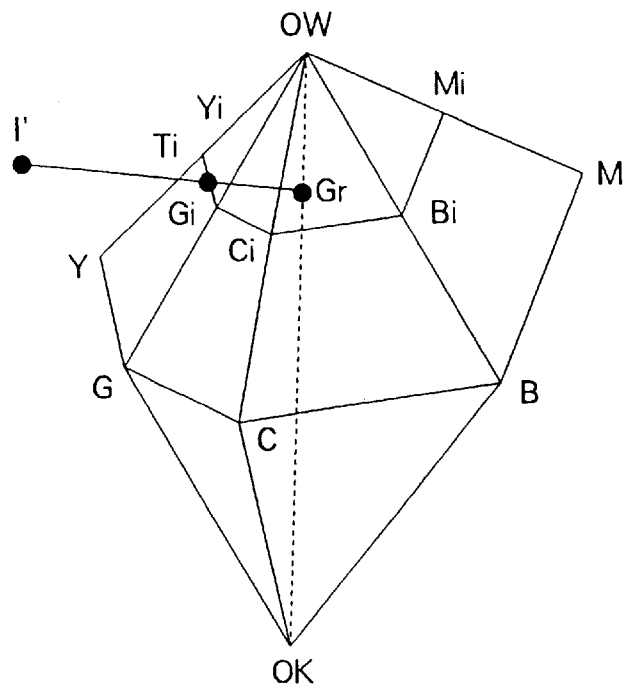
FIG. 29 shows a perspective view of the color projection process in the third embodiment.

FIG. 29 illustrates the case in which the distance from Gr to I' exceeds the distance from Gr to Ti.

By performing the color adjustment process first, the third embodiment assures that all input colors are mapped onto colors within the output polyhedron (opol) defined by most vivid reproducible output colors (C, B, M, R, Y, G), and by the output white and black points (OW and OK). This output polyhedron opol approximates the true gamut of colors reproducible in the output system sufficiently closely that substantially all of the output colors produced by the third embodiment can actually be reproduced.

The color adjustment process also assures that colors which appear to have the same hue in the input color space are mapped to colors that appear to have the same hue in the output color space. In particular, the input white axis is mapped onto the output white axis, so that areas that appeared colorless in the input image also appear colorless in the output image.

When the adjusted color is exterior to the output polyhedron opol, the input color is preferably mapped to the color at which a line drawn from the output white axis to the adjusted color intersects the surface of the output polyhedron. In the description above, this line is drawn from the output gray color Gr having the same lightness as the input color and adjusted color. The third embodiment can be varied, however, by drawing this line from an output gray color having the same lightness as an edge color of the output polyhedron, as in the second embodiment, thereby allowing lightness values to change in order to reduce loss of saturation.

In the third embodiment as described above, there are some cases in which an input color exterior to the first polyhedron is mapped to a color in the interior of the first polyhedron, instead of a color on the surface of the first polyhedron. This occurs, for example, if the lightness level of the adjusted color I' in FIG. 28 is intermediate between the lightness levels of the most vivid green and yellow colors G and Y.

The operation of the reproducible color determiner 44 can accordingly be varied as follows. The reproducible color determiner 44 determines an edge color on the first polyhedron opol, having the same chromaticity coordinates as the intersection T, and compares the lightness of the adjusted color I' with the lightness of this edge color. If the adjusted color I' is lighter than the edge color, the reproducible color determiner 44 uses the output white color OW in all ratio calculations. If the adjusted color I' is darker than the edge color, the reproducible color determiner 44 uses the output black color OK in all ratio calculations. The color Ti found by the intersection calculator 70 will then always lie on the surface of the first polyhedron; that is, Ti will always approximate the most vivid reproducible color having the same lightness and hue as the adjusted color I'.

Fourth Embodiment

Figure 30:
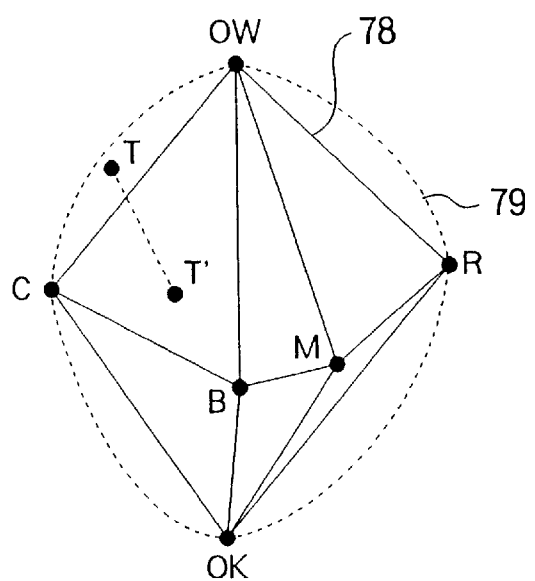
FIG. 30 shows the first polyhedron, as used in a fourth embodiment of the invention.

Referring to FIG. 30, in the fourth embodiment, as in the preceding embodiment, an input color T that cannot be reproduced by the output system is projected onto an output polyhedron 78 (opol) defined by the output white color OW, output black color OK, and a number of most vivid reproducible output colors, e.g. cyan, blue, magenta, red, yellow, and green, as represented by the letters C, B, M, R, Y, and G in the drawing. This polyhedron 78 approximates the reproducible gamut of colors 79 in the output system.

Figure 31:
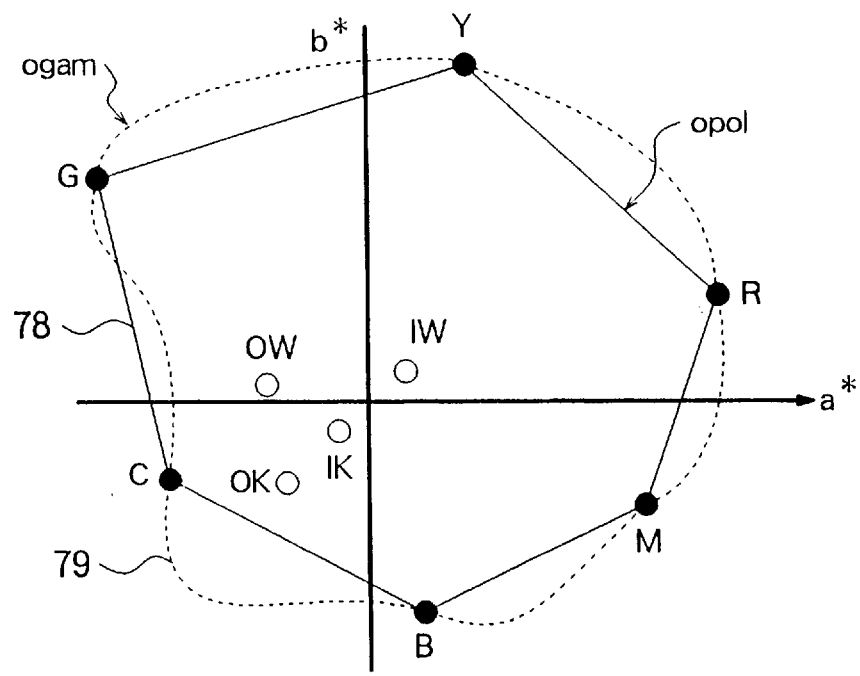
FIG. 31 shows a projection of the first polyhedron onto the chromaticity plane.

FIG. 31 shows the output polyhedron 78 (opol) and the reproducible gamut of colors 79, denoted ogam, projected on a chromaticity diagram in the a*b* plane of the CIE L*a*b* color coordinate system. The input white color IW and input black color IK need not have the same a*b* coordinates in the fourth embodiment. The a*b* coordinates of the output white point OW and output black point OK may also differ.

Figure 32:
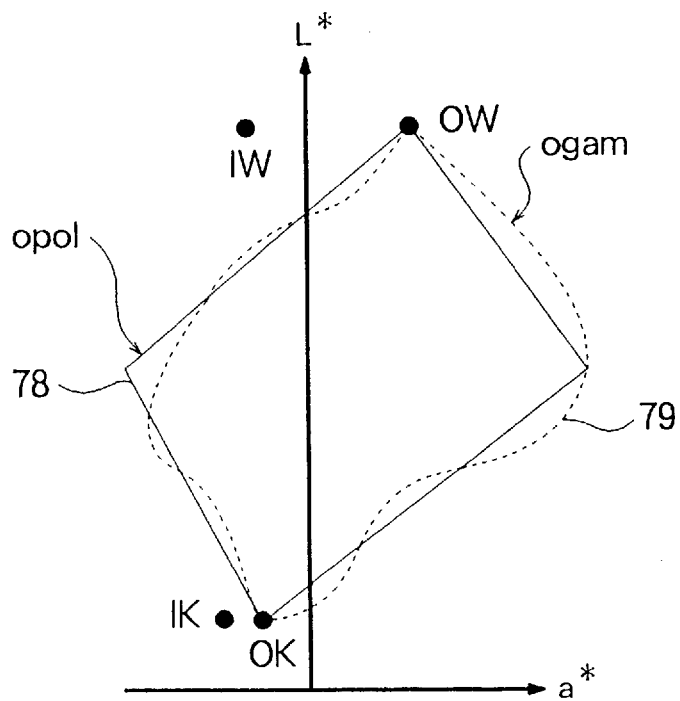
FIG. 32 shows a projection of the first polyhedron perpendicular to the chromaticity plane.

FIG. 32 shows opol 78 and ogam 79 projected on the L*a* plane, together with the input and output white and black points IW, IK, OW, and OK. It will be assumed that the scaling process described in the first embodiment has already been performed, so that IW and IK have the same lightness levels as OW and OK, respectively.

Figure 33:
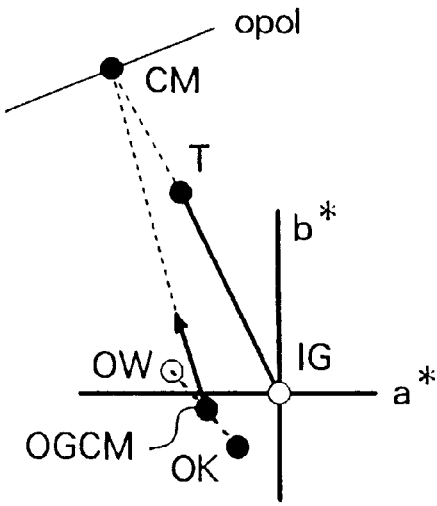
FIG. 33 illustrates the determination of a hue vector in the fourth embodiment.
Figure 34:
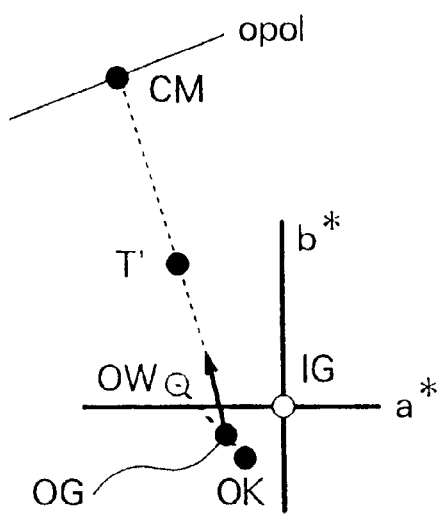
FIG. 34 illustrates the determination of the output color in the fourth embodiment.

FIGS. 33 and 34 illustrate the basic idea of the fourth embodiment.

In FIG. 33, the hue of an input color T is determined by finding an edge color CM on the output polyhedron opol that appears to have the same hue as T when viewed from an input gray color IG having the same lightness as T. The saturation of T in relation to IG (the distance from IG to T) is also determined. Then a unit vector pointing toward the edge color CM from an output gray color OGCM having the same lightness value as CM is found.

In FIG. 34, the output color is obtained by adding the above unit vector, multiplied by the above saturation, to an output gray color OG having the same lightness value as T. If necessary, the saturation of the output color is reduced to bring the output color from a point exterior to the output polyhedron to a point on the surface of the output polyhedron.

Figure 35:
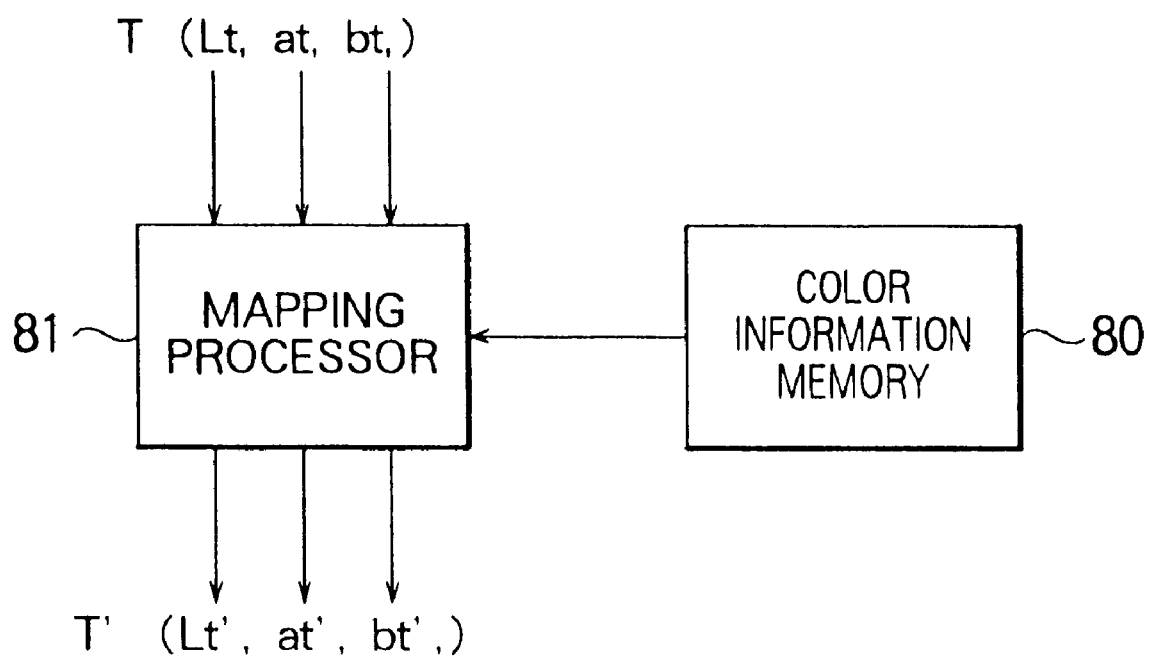
FIG. 35 shows the basic configuration of an apparatus used in the fourth embodiment.

Referring to FIG. 35, the fourth embodiment comprises a color information memory 80 and a mapping processor 81. The color information memory 80, which is part of the color parameter memory 8 in FIG. 2, stores the coordinates of the above-mentioned most vivid colors (Cpol information) and the coordinates of the output white and black colors (Mpol information). The mapping processor 81, which is equivalent to the color mapping processor 14 in FIG. 2, maps an input color T with coordinates (Lt, at, bt) to an output color with coordinates (Lt', at', bt'). Lt and Lt' are lightness (L*) coordinates, at and at' are a* chromaticity coordinates, and bt and bt' are b* chromaticity coordinates.

Figure 36:
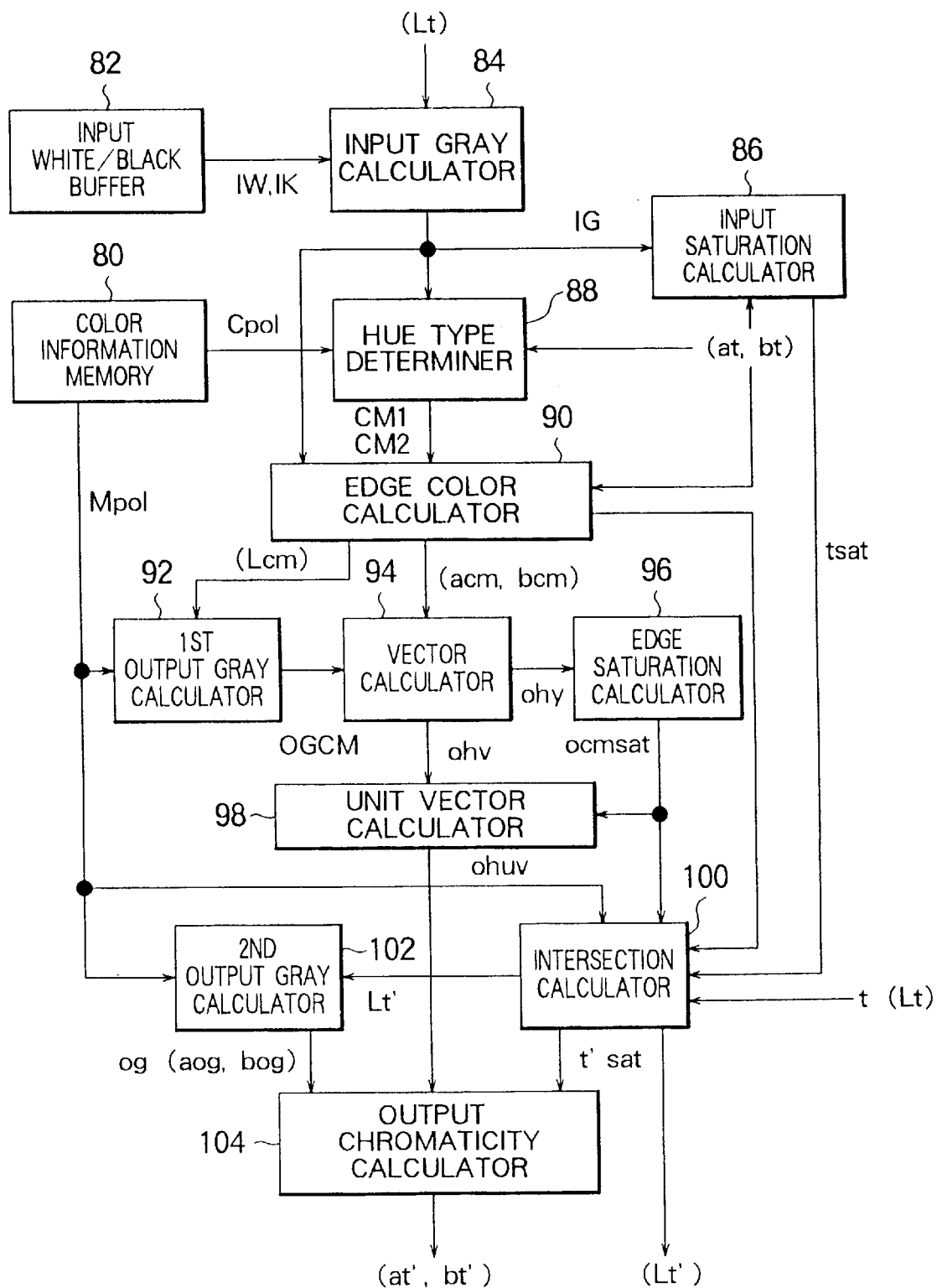
FIG. 36 shows the more detailed configuration of this apparatus.

Referring to FIG. 36, the mapping processor 81 comprises an input white/black buffer 82, an input gray calculator 84, an input saturation calculator 86, a hue type determiner 88, an edge color calculator 90, a first output gray calculator 92, a vector calculator 94, an edge saturation calculator 96, a unit vector calculator 98, an intersection calculator 100, a second output gray calculator 102, and an output chromaticity calculator 104. The input white/black buffer 82 stores the coordinates (Liw, aiw, biw) of the input white color IW and the coordinates (Lik, aik, bik) of the input black color IK.

Next, the operation of the fourth embodiment will be described, with reference to the flowchart in FIG. 37.

In the first step S11, given the lightness coordinate Lt of the input color T, the input gray calculator 84 uses the input white and black coordinates furnished by the input white/black buffer 82 to calculate the a* and b* chromaticity coordinates (aig and big) of the input gray color IG as follows.

$$aig = (aiw - aik)\frac{Lt - Lik}{Liw - Lik} + aik$$

$$big = (biw - bik)\frac{Lt - Lik}{Liw - Lik} + bik$$

In the next step S12, the input saturation calculator 86 calculates the saturation (tsat) of the input color T in the input color space by calculating the distance from the input color T to the input gray color IG.

Figure 38:
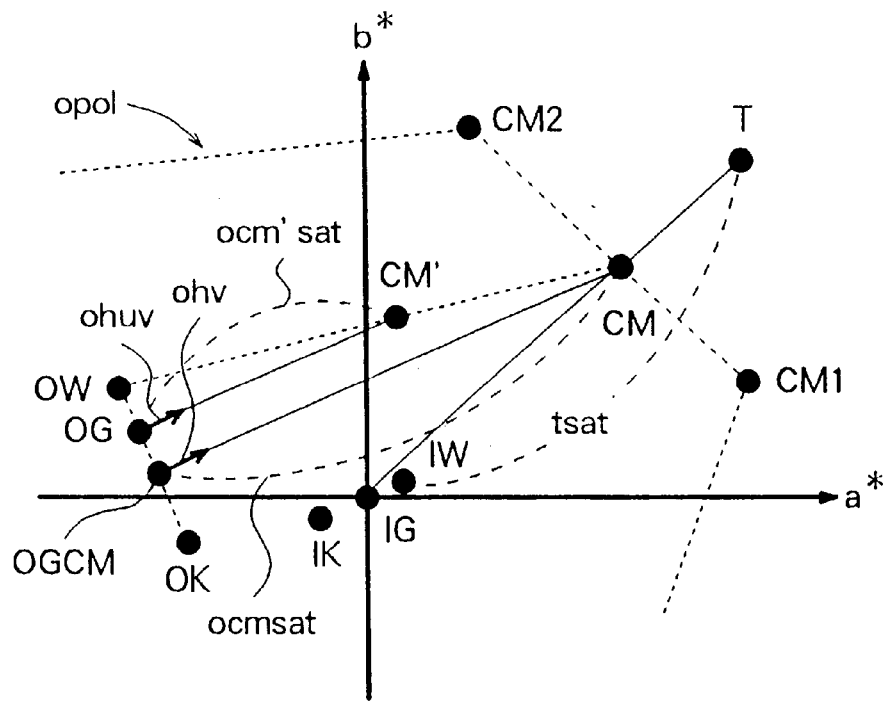
FIG. 38 illustrates the operation of the fourth embodiment as seen in the chromaticity plane.

In the next step S13, the hue type determiner 88 selects a vivid edge of the output polyhedron opol including the hue of the input color T, as seen from the input gray point, and gets the coordinates of the vertices of that edge from the color information memory 80. Referring to FIG. 38, the hue type determiner 88 gets the coordinates of two vertices CM1 and CM2 of polyhedron opol. This step is the same as step S2 in the second embodiment.

In the next step S14, the edge color calculator 90 determines the coordinates of a color CM on the edge joining CM1 and CM2 such that when T, IG, and CM are projected onto the a*b* plane, a line drawn from IG through T also passes through CM. This step is equivalent to steps S3 and S4 in the second embodiment.

First, the edge color calculator 90 finds the a* and b* coordinates of CM (acm and bcm), by solving the following simultaneous equations for a and b.

$$b = \frac{bcm2 - bcm1}{acm2 - acm1} \times a + \frac{(bcm2 - acm1) \times (bcm2 - bcm1)}{acm2 - acm1}$$

$$b = \frac{bt}{at} \times a$$

The L* coordinate of CM (Lcm) is then found by a ratio calculation, using the lightness coordinates of CM1 and CM2 (Lcm1 and Lcm2). This edge color CM approximates the most vivid reproducible output color having the same hue as T.

In the next step S15, the first output gray calculator 92 finds the coordinates of a first output gray color OGCM having the same lightness as the edge color CM. These coordinates (aogcm and bogcm) are calculated as follows, using the lightness coordinates of the output white color (Low) and output black color (Lok).

$$aogcm = (aow - aok)\frac{Lcm - Lok}{Low - Lok} + aok$$

$$bogcm = (bow - bok)\frac{Lcm - Lok}{Low - Lok} + bok$$

In the next step S16, the vector calculator 94 calculates the coordinates of a hue vector (ohv) extending from the first output gray color OGCM to the edge color CM.

$$ohv=(acm-aogcm, bcm-bogcm)$$

In the next step S17, the edge saturation calculator 96 determines the length of this hue vector (ohv), i.e. the distance from OGCM to CM. This length is a scalar quantity indicating the saturation (ocmsat) of the edge color CM in the output color space.

In the next step S18, the unit vector calculator 98 reduces the vector ohv to a unit vector (ohuv) expressing the hue of the edge color CM in the output color space. The unit vector ohuv is obtained by dividing the vector ohv by the scalar ocmsat.

In the next step S19, the intersection calculator 100 finds a surface color CM' disposed on the segment joining the edge color CM to the output white color OW or output black color OK, having the same lightness as the input color T, and computes an output saturation value t'sat that will be used for the output color.

The intersection calculator 100 also outputs the lightness coordinate (Lt') of the output color. In the present embodiment, the lightness coordinate Lcm' of CM' is used as the lightness coordinate Lt' of the output color. Lt' is thus equal to the input lightness coordinate Lt.

Figure 39:
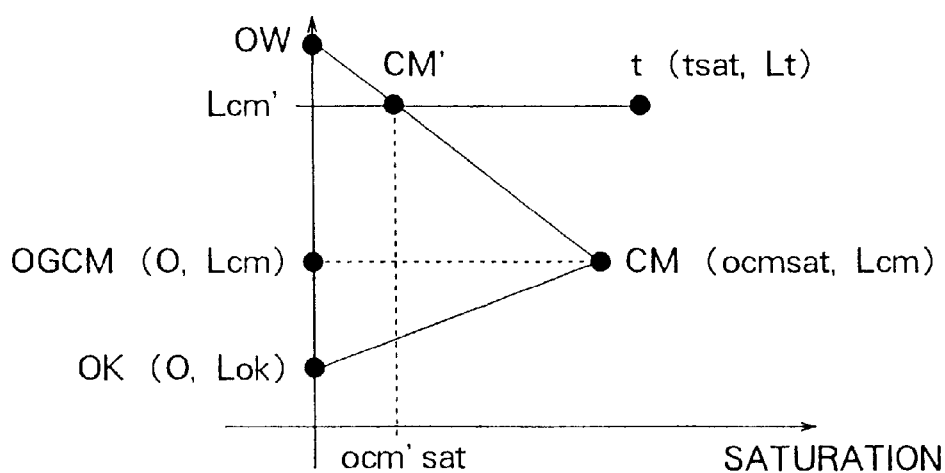
FIG. 39 illustrates the operation of the fourth embodiment as seen in a saturation-lightness plane.

The intersection calculator 100 does not have to find the a* and b* coordinates of CM'. Only its saturation value (ocm'sat) is required. The intersection calculator 100 accordingly operates in the saturation-lightness plane shown in FIG. 39, with saturation on the horizontal axis and lightness on the vertical axis. The edge color CM has coordinates (ocmsat, Lcm) in this plane. The coordinates (tsat, Lt) describe a target point (t) having the same lightness as the input color T, and the same saturation (tsat) in relation to the output white axis as the input color T had in relation to the input white axis.

If T is lighter than the edge color CM, the coordinates of CM' are found from the equation for the line joining CM and the output white color OW, by setting the lightness coordinate (Lcm') equal to Lt and solving for the saturation (ocm'sat). This is the case illustrated in FIG. 39. If T is darker than the edge color CM, the coordinates of CM' are found in the same way from the equation for the line joining CM and the output black color OK.

Next, the saturation (ocm'sat) of CM' is compared with the saturation (tsat) of T, as calculated earlier by the input saturation calculator 86. The output saturation value t'sat is set equal to the lesser of these two saturation values ocm'sat and tsat.

In the next step S20, the second output gray calculator 102 finds the coordinates of a second output gray color OG having the same lightness value as the output lightness (Lt'). The a* and b* coordinates of OG (aog and bog) are found by a ratio calculation, using the coordinates of the output white color OW (Low, aow, bow) and the output black color OK (Lok, aok, bok), and the lightness coordinate Lt'.

In the next step S21, tie output chromaticity calculator 104 multiplies the unit vector ohuv by the output saturation value t'sat, and adds the result to the chromaticity coordinates (a* and b* coordinates) of the output gray color OG found in step S20 to produce the chromaticity coordinates of the output color T'. If the a* and b* coordinates of the unit vector ohuv are aohuv and bohuv, then the a* and b* coordinates of T' (at' and bt') are given as follows.

$$at' = aog + aohuv \times t'sat$$

$$bt' = bog + bohuv \times t'sat$$

In geometric terms, the output chromaticity calculator 104 extends a line from the output gray color OG, parallel to a line from OGCM to the edge color CM, and places the output color on this line extending from OG, at a distance t'sat from OG.

The fourth embodiment maps all input colors to colors within the output polyhedron (opol) that approximates the gamut of reproducible output colors. Moreover, input colors having the same hue, as seen in the input color space, are mapped to output colors that have the same hue as seen in the output color space. In particular, input white, black, and gray colors (tsat=0) are mapped to output white, black, and gray colors (t'sat=0), while highly saturated colors (tsat>ocm'sat) are mapped onto the most vivid colors that the output system can reproduce at the same lightness level. The result is a natural reproduction of the original image.

The fourth embodiment differs from the third embodiment in its use of the unaltered input saturation (tsat) as the output saturation (t'sat) in the interior of the output polyhedron opol.

Fifth Embodiment

Figure 37:
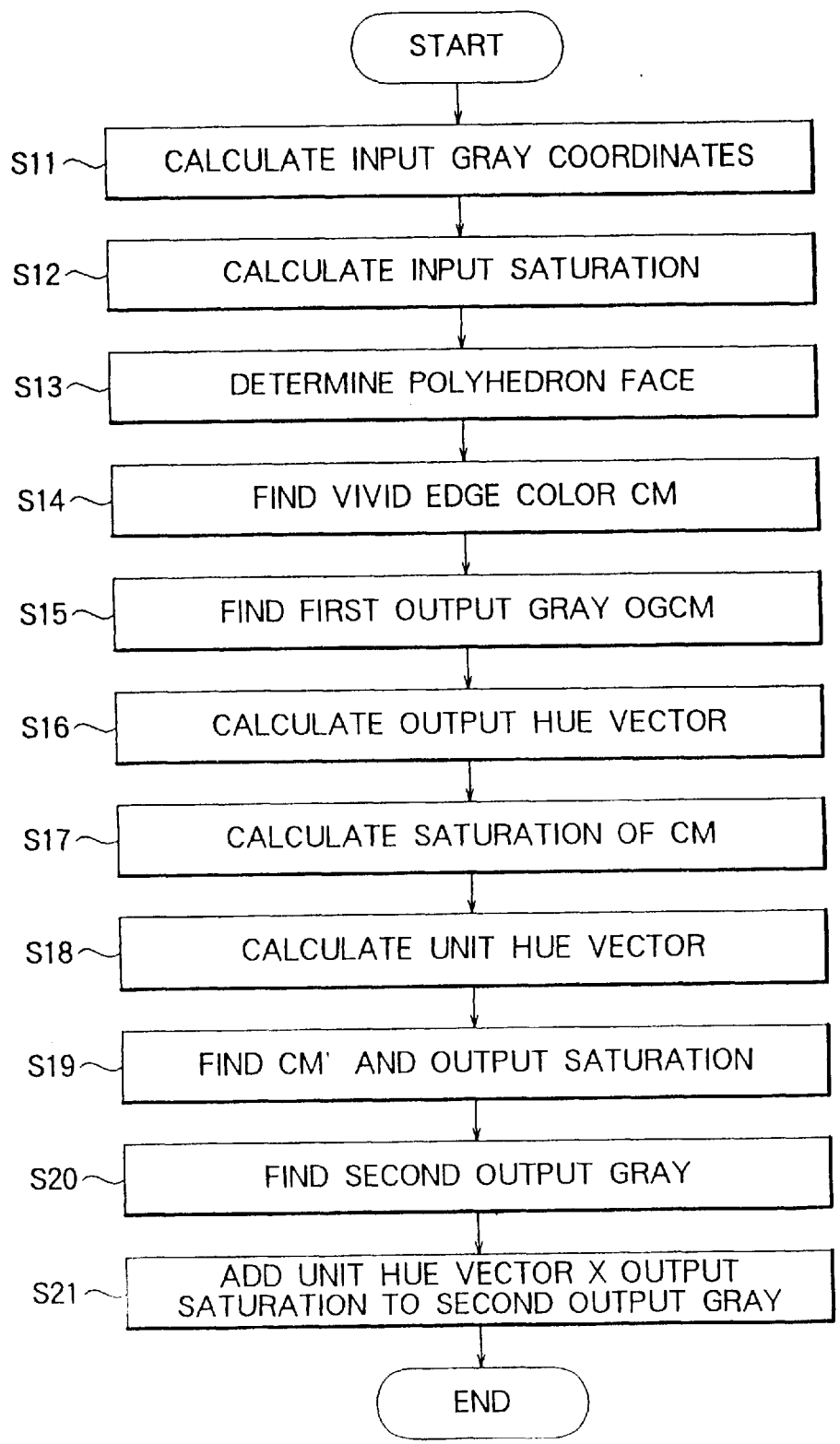
FIG. 37 is a flowchart describing the operation of the fourth embodiment.

The fifth embodiment has the same configuration as the fourth embodiment, shown in FIGS. 35 and 36, and carries out steps S11 to S18, step S20, and step S21 in FIG. 37 in the same way as the fourth embodiment. The only difference is in regard to step S19, which will be described below.

Figure 40:
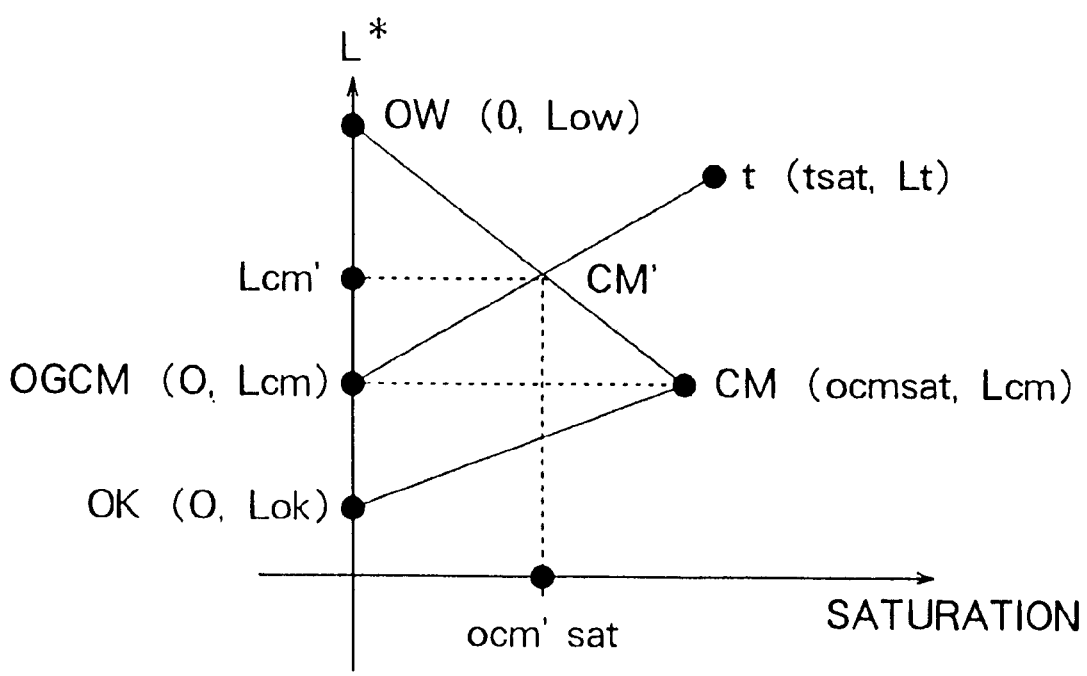
FIG. 40 illustrates the operation of a fifth embodiment of the invention, as seen in the saturation-lightness plane

Referring to FIG. 40, in the fifth embodiment, to determine the output saturation value tsat', the intersection calculator 100 starts in the same way as before, by comparing the lightness of the input color T (Lt) with the lightness of the edge color CM (Lcm). The vertical axis in FIG. 40 indicates lightness, while the horizontal axis indicates saturation, as in FIG. 39.

Next, operating in the saturation-lightness plane, the intersection calculator 100 finds the intersection CM' of a line drawn from the first output gray color OGCM through the target point (t) having saturation and lightness coordinates matching those of the input color (tsat, Lt) with a line joining CM to OW (if Lt exceeds Lcm) or OK (if Lt is less than Lcm). CM' is thus the unique intersection of a line drawn from OGCM through t with the two lines drawn from CM through OW and OK.

FIG. 40 illustrates the case in which Lt exceeds Lcm. The saturation and lightness coordinates of CM' are found by solving two simultaneous equations, one for the line through OW and CM, the other for the line through (tsat, Lt) and OGCM. The saturation value tsat is used in relation to the output white axis in this calculation, even though tsat was originally determined in relation to the input white axis.

To determine the output saturation value t'sat, the intersection calculator 100 now compares the distance from OGCM to the target point (t) in FIG. 40 with the distance from OGCM to CM'. If the distance from OGCM to t is equal to or less than the distance from OGCM to CM', the original saturation tsat is used as the output saturation value t'sat. If the distance from OGCM to t exceeds the distance from OGCM to CM', the saturation of CM' (ocm'sat) is used as the output saturation value t'sat.

The intersection calculator also finds the lightness coordinate (Lcm') of CM', and the lightness coordinate Lt' of the output color. The output lightness coordinate Lt' is set equal to the input lightness coordinate Lt if the distance from OGCM to t is equal to or less than the distance from OGCM to CM', and to Lcm' if the distance from OGCM to t exceeds the distance from OGCM to CM'.

Use of these values for t'sat and Lt' assures that the output color produced in step S21 will be disposed within the polyhedron opol, as in the fourth embodiment.

The fifth embodiment combines the advantages of the second and fourth embodiments. As in the fourth embodiment, like input hues are mapped to like output hues, and substantially all output colors can actually be reproduced in the output system. As in the second embodiment, lightness and saturation are mapped interdependently, so that highly saturated input colors are mapped to highly saturated output colors, possibly with different lightness, rather than to less saturated colors with identical lightness levels. The fifth embodiment accordingly tends to produce more vivid output images than does the fourth embodiment.

The embodiments above can be implemented by specialized arithmetic and logic processing circuits provided in a color printer. Alternatively, a general-purpose processor such as a microprocessor or microcontroller disposed in the printer can be programmed to carry out the necessary steps.

The invention can also be practiced by means of a printer driver disposed in a computer to which a color printer is connected. The printer driver can be supplied as software on a data recording medium, such as a magnetic disk or optical disk, for installation as part of the computer's operating system. In this case the color parameter memory 8 in FIG. 2 will normally be a file or table of parameter values stored on the data recording medium.

The invention is not limited to use with color printers, but is generally applicable when a color image, generated for a first color image output device, is reproduced by a second color image output device having a different gamut of reproducible colors.

A few variations of the preceding embodiments have been described above, but those skilled in the art will recognize that further variations are possible within the scope claimed below.

What is claimed is:

1. A method of converting input colors reproducible by a first color image output device to output colors reproducible by a second color image output device, said input colors and said output colors being defined in a color coordinate system with separate lightness and chromaticity coordinates, comprising the steps of:

selecting an input white color having a maximum lightness reproducible by said first color image output device;

selecting an input black color having a minimum lightness reproducible by said first color image output device;

selecting an output white color having a maximum lightness reproducible by said second color image output device;

selecting an output black color having a minimum lightness reproducible by said second color image output device;

determining a scaling coefficient according to a ratio of a lightness difference between said output white color and said output black color to a lightness difference between said input white color and said input black color; and scaling said color coordinate system according to said scaling coefficient.

2. The method of claim 1, wherein said step of scaling is performed on lightness coordinates in said color coordinate system.

3. The method of claim 1, wherein said step of scaling is performed on chromaticity coordinates in said color coordinate system.

4. The method of claim 1, wherein said step of scaling is performed on both lightness coordinates and chromaticity coordinates in said color coordinate system.

5. The method of claim 1, further comprising the steps of:
constructing an input white axis comprising all colors disposed on a straight segment joining said input white color to said input black color;
constructing an output white axis comprising all colors disposed on a straight segment joining said output white color to said output black color;
selecting at least three most vivid colors having different hues, said most vivid colors being shades of said hues reproducible by said second color image output device with maximum distance from said output white axis;
constructing a first polyhedron having as vertices said most vivid colors, said output white color, and said output black color;
mapping said input colors to output, colors within said first polyhedron, said most vivid colors being left fixed.

6. A method of converting input colors reproducible by a first color image output device to output colors reproducible by a second color image output device, said input colors and said output colors being defined in a color coordinate system with separate lightness and chromaticity coordinates, comprising the steps of:
selecting an input white color having a maximum lightness reproducible by said first color image output device;
selecting an input black color having a minimum lightness reproducible by said first color image output device;
selecting an output white color having a maximum lightness reproducible by said second color image output device;
selecting an output black color having a minimum lightness reproducible by said second color image output device;
constructing an input white axis comprising all colors disposed on a straight segment joining said input white color to said input black color;
constructing an output white axis comprising all colors disposed on a straight segment joining said output white color to said output black color;
selecting at least three most vivid colors having different hues, said most vivid colors being shades of said hues reproducible by said second color image output device with maximum distance from said output white axis;
constructing a first polyhedron having as vertices said most vivid colors, said output white color, and said output black color;
mapping said input colors to output colors within said first polyhedron, said most vivid colors being left fixed.

7. The method of claim 6, wherein said second color image output device reproduces colors by subtractive mixing of three primary colors, and said three primary colors are included among said most vivid colors.

8. The method of claim 7, wherein three secondary colors complementary to said three primary colors are also included among said most vivid colors.

9. The method of claim 6, wherein:
said first color image output device reproduces colors by additive mixing of red, green, and blue;
said second color image output device reproduces colors by subtractive mixing of magenta, cyan, and yellow; and
the hues of said most vivid colors are cyan, magenta, yellow, red, green, and blue, said first polyhedron accordingly having just eight vertices and twelve faces.

10. A method of converting input colors reproducible by a first color image output device to output colors reproducible by a second color image output device, said input colors and said output colors being defined in a color coordinate system with separate lightness and chromaticity coordinates, comprising the steps of:
selecting an input white color having a maximum lightness reproducible by said first color image output device;
selecting an input black color having a minimum lightness reproducible by said first color image output device;
selecting an output white color having a maximum lightness reproducible by said second color image output device;
selecting an output black color having a minimum lightness reproducible by said second color image output device;
constructing an input white axis comprising all colors disposed on a straight segment joining said input white color to said input black color;
constructing an output white axis comprising all colors disposed on a straight segment joining said output white color to said output black color;
selecting at least three most vivid colors having different hues, said most vivid colors being shades of said hues reproducible by said second color image output device with maximum distance from said output white axis;
constructing a first polyhedron having as vertices said most vivid colors, said output white color, and said output black color;
receiving an input color having a certain input lightness coordinate;
projecting said input color and said input white axis onto a chromaticity diagram having only chromaticity coordinates;
projecting said most vivid colors onto said chromaticity diagram, thereby forming a first polygon having said most vivid colors as vertices in said chromaticity diagram;
determining a first intersection of said first polygon with a first line extending from said input white axis through said input color in said chromaticity diagram; and
mapping said input color to an output color having a hue, in relation to said output white axis, identical to a hue of said first intersection point, in relation to said output white axis, said output color being disposed on said output white axis if said input color is disposed on said input white axis, and said output color being equal to said input color if said input color is one of said most vivid colors.

11. The method of claim 10, wherein said first line extends from a first input gray color on said input white axis, said first input gray color having a lightness coordinate equal to said input lightness coordinate.

12. The method of claim 10, wherein said step of mapping said input color comprises the further steps of:

selecting, on said output white axis, a first output gray color equal in lightness to said input color, and projecting said first output gray color onto said chromaticity diagram;

constructing, in said chromaticity diagram, a second line from said first output gray color through said first intersection;

selecting, on said second line, an adjusted point such that distances from said input white axis to said first intersection and said input color are in equal ratio to distances from said first output gray color to said first intersection and said adjusted point;

selecting an adjusted color having chromaticity coordinates equal to chromaticity coordinates of said adjusted point and having a lightness coordinate equal to said input lightness coordinate; and mapping said input color to an output color disposed within said first polyhedron on a line segment extending from said output white axis to said adjusted color.

13. The method of claim 12, wherein said line segment extends from said first output gray color to said adjusted color.

14. The method of claim 12, wherein said output color is equal to said adjusted color if said adjusted color is disposed within said first polyhedron, and said output color is disposed on a surface of said first polyhedron if said adjusted color is not disposed within said first polyhedron.

15. The method of claim 11, wherein said step of mapping said input color comprises the further steps of:

calculating a first distance from said first input gray color to said input color;

selecting an edge color disposed on an edge of said first polyhedron, said edge color and said first intersection having equal chromaticity coordinates;

selecting, on said output white axis, a first output gray color equal in lightness to said input color;

selecting, on said output white axis, a second output gray color equal in lightness to said edge color;

extending a third line from said first output gray color parallel to a line from said second output gray color to said edge color;

determining a second intersection of said third line with a surface of said first polyhedron;

determining a second distance from said first output gray color to said second intersection;

setting a third distance equal to said first distance if said first distance does not exceed said second distance, and equal to said second distance if said first distance exceeds said second distance; and mapping said input color to an output color disposed on said third line at said third distance from said first output gray color.

16. The method of claim 11, wherein said step of mapping said input color comprises the further steps of:

calculating a first distance from said first input gray color to said input color;

selecting an edge color disposed on an edge of said first polyhedron, said edge color and said first intersection having equal chromaticity coordinates;

selecting, on said output white axis, a second output gray color equal in lightness to said edge color;

projecting said edge color, said second output gray color, said output white color, and said output black color onto a saturation-lightness plane;

selecting, in said saturation-lightness plane, a target point having a saturation coordinate equal to said first distance and a lightness coordinate equal to said input lightness coordinate;

determining a single third intersection, in said saturation-lightness plane, of a line extending from said second output gray color through said target color and lines extending from said edge color through said output white color and said output black color;

determining a fourth distance from said second output gray color to said third intersection;

determining a fifth distance from said second output gray color to said target point;

setting an output lightness coordinate equal to said input lightness coordinate if said fifth distance does not exceed said fourth distance, and to a lightness coordinate of said third intersection if said fifth distance exceeds said fourth distance;

setting an output saturation value equal to said first distance if said fifth distance does not exceed said fourth distance, and to a saturation coordinate of said third intersection if said fifth distance exceeds said fourth distance;

selecting, on said output white axis, a third output gray color having a lightness coordinate equal to said output lightness coordinate;

constructing a fourth line extending from said third output gray color parallel to a line from said second output gray color to said edge color; and mapping said input color to an output color disposed on said fourth line at a distance equal to said output saturation value from said third output gray color.

17. A method of converting input colors reproducible by a first color image output device to output colors reproducible by a second color image output device, said input colors and said output colors being defined in a color coordinate system with separate lightness and chromaticity coordinates, comprising the steps of:

selecting an input white color having a maximum lightness reproducible by said first color image output device;

selecting an input black color having a minimum lightness reproducible by said first color image output device;

selecting an output white color having a maximum lightness reproducible by said second color image output device;

selecting an output black color having a minimum lightness reproducible by said second color image output device;

constructing an input white axis comprising all colors disposed on a straight segment joining said input white color to said input black color;

constructing an output white axis comprising all colors disposed on a straight segment joining said output white color to said output black color;

selecting at least three most vivid colors having different hues, said most vivid colors being shades of said hues reproducible by said second color image output device with maximum distance from said output white axis;

constructing a first polyhedron having as vertices said most vivid colors, said output white color, and said output black color;

selecting, on said input white axis, a white vertex color such that said white vertex color and said output white color have equal lightness coordinates;

selecting, on said input white axis, a black vertex color such that said black vertex color and said output black color have equal lightness coordinates;

constructing a second polyhedron having as vertices said most vivid colors, said white vertex color, and said black vertex color;

mapping said input colors into said second polyhedron, said most vivid colors being left fixed, and input colors disposed on said input white axis being mapped onto said input white axis; and mapping colors in said second polyhedron to colors in said first polyhedron, said most vivid colors being left fixed, lightness coordinates being left unchanged, and colors on said input white axis being mapped to colors on said output white axis.

18. The method of claim 17, wherein said step of mapping said input colors into said second polyhedron preserves hue.

19. The method of claim 17, wherein said step of mapping said input colors into said second polyhedron comprises the further steps of:

receiving an input color having a certain input lightness coordinate;

projecting said input color and said input white axis onto a chromaticity diagram having only chromaticity coordinates;

projecting said most vivid colors onto said chromaticity diagram, thereby forming a first polygon having said most vivid colors as vertices in said chromaticity diagram;

determining a first intersection of said first polygon with a first line extending from said input white axis through said input color in said chromaticity diagram;

determining an edge color disposed on an edge of said second polyhedron such that said edge color and said first intersection have equal chromaticity coordinates;

determining a second input gray color disposed on said input white axis, said edge color and said second input gray color having equal lightness coordinates;

constructing a fifth line from said second input gray color through said input color; and mapping said input color to a surface color disposed at an intersection of said fifth line with a surface of said second polyhedron if said input color is disposed exterior to said second polyhedron, said input color being left fixed if said input color is disposed within said second polyhedron.

20. A color conversion apparatus mapping input colors reproducible by a first color image output device to output colors reproducible by a second color image output device, said input colors and said output colors being defined in a color coordinate system with separate lightness and chromaticity coordinates, comprising:

a color parameter memory storing coordinates of an input white color having a maximum lightness reproducible by said first color image output device, an input black color having a minimum lightness reproducible by said first color image output device, an output white color having a maximum lightness reproducible by said second color image output device, and an output black color having a minimum lightness reproducible by said second color image output device;

a scaling coefficient calculator coupled to said color parameter memory, for determining a scaling coefficient according to a ratio of a lightness difference between said output white color and said output black color to a lightness difference between said input white color and said input black color; and a scaling processor for scaling said color coordinate system according to said scaling coefficient.

21. The apparatus of claim 20, wherein said color parameter memory also stores coordinates of at least three most vivid colors of different hues, said most vivid colors being shades of said hues most vividly reproducible by said second color image output device, further comprising:

a mapping processor for mapping said input colors, after scaling by said scaling processor, into a first polyhedron in said color coordinate system, said first polyhedron having as vertices said output white color, said output black color, and said most vivid colors.

22. The apparatus of claim 21, wherein said mapping processor maps input colors disposed on an input white axis joining said input white color to said input black color to output colors disposed on an output white axis joining said output white color to said output black color.

23. The apparatus of claim 22, wherein said mapping processor leaves said most vivid colors fixed.

24. A color conversion apparatus mapping input colors reproducible by a first color image output device to output colors reproducible by a second color image output device, said input colors and said output colors being defined in a color coordinate system with separate lightness and chromaticity coordinates, comprising:

a color parameter memory storing coordinates of an input white color having a maximum lightness reproducible by said first color image output device, an input black color having a minimum lightness reproducible by said first color image output device, an output white color having a maximum lightness reproducible by said second color image output device, an output black color having a minimum lightness reproducible by said second color image output device, and at least three most vivid colors of different hues, said most vivid colors being shades of said hues most vividly reproducible by said second color image output device, said input white color and said input black color defining an input white axis, said output white color and said output black color defining an output white axis, and said output white color, said output black color, and said most vivid colors defining vertices of a first polyhedron in said color coordinate system;

a color adjustment processor for receiving an input color having a certain input lightness coordinate, projecting said input color and said input white axis onto a chromaticity diagram having only chromaticity coordinates, projecting said most vivid colors onto said chromaticity diagram, thereby forming a first polygon having said most vivid colors as vertices in said chromaticity diagram, determining a first intersection of said first polygon with a first line extending from said input white axis through said input color in said chromaticity diagram, selecting, on said output white axis, a first output gray color equal in lightness to said input color, projecting said first output gray color onto said chromaticity diagram, constructing, in said chromaticity diagram, a second line from said first output gray color through said first intersection, selecting, on said second line, an adjusted point such that distances from said first input gray color to said first intersection and said input color are in equal ratio to distances from said first output gray color to said first intersection and said adjusted point, and selecting an adjusted color having chromaticity coordinates equal to said adjusted point and having a lightness coordinate equal to said input lightness coordinate;

a reproducible color determiner for projecting a section through said first polyhedron at a lightness level equal to said input lightness coordinate onto said chromaticity diagram, thereby obtaining a second polygon in said chromaticity diagram; and a mapping decision processor coupled to said color adjustment processor and said reproducible color determiner, for finding a fourth intersection of an edge of said second polygon with said second line, and mapping said input color to an output color having a lightness coordinate equal to said input lightness coordinate, said output color having chromaticity coordinates equal to chromaticity coordinates of said adjusted color, if said adjusted point is disposed within said second polygon, and having chromaticity coordinates equal to chromaticity coordinates of said fourth intersection, if said adjusted point is not disposed within said second polygon.

25. A color conversion apparatus mapping input colors reproducible by a first color image output device to output colors reproducible by a second color image output device, said input colors and said output colors being defined in a color coordinate system with separate lightness and chromaticity coordinates, comprising:

a color parameter memory storing coordinates of an input white color having a maximum lightness reproducible by said first color image output device, an input black color having a minimum lightness reproducible by said first color image output device, an output white color having a maximum lightness reproducible by said second color image output device, an output black color having a minimum lightness reproducible by said second color image output device, and at least three most vivid colors of different hues, said most vivid colors being shades of said hues most vividly reproducible by said second color image output device, said input white color and said input black color defining an input white axis, said output white color and said output black color defining an output white axis, and said output white color, said output black color, and said most vivid colors defining vertices of a first polyhedron in said color coordinate system;

an input gray calculator for receiving an input color having a certain input lightness coordinate, and selecting, on said input white axis, an input gray color having a lightness coordinate equal to said input lightness coordinate;

an input saturation calculator for calculating a first distance from said an input gray color to said input color;

an edge color calculator for projecting said input color and said input gray color onto a chromaticity diagram having only chromaticity coordinates, projecting said most vivid colors onto said chromaticity diagram, thereby forming a first polygon having said most vivid colors as vertices in said chromaticity diagram, determining a first intersection of said first polygon with a first line extending from said input gray color through said input color in said chromaticity diagram, and determining an edge color disposed on an edge of said first polyhedron such that said edge color and said first intersection have equal chromaticity coordinates;

a first output gray calculator for determining a second output gray color disposed on said output white axis such that said edge color and said second output gray color have equal lightness coordinates;

a vector calculator for constructing a vector from said second output gray color to said edge color;

an edge saturation calculator for measuring a sixth distance from said second output gray color to said edge color;

a unit vector calculator for dividing said vector by said sixth distance to obtain a unit vector;

a first intersection calculator for selecting a fourth output gray color on said output white axis, projecting said output white color, said output black color, said fourth output gray color, and said edge color onto a saturation-lightness plane, selecting, in said saturation-lightness plane, a target point having a saturation coordinate equal to said first distance and a lightness coordinate equal said input lightness coordinate, finding a fifth intersection of a line extending from said fourth output gray point through said target point with lines extending from said edge point through said output white point and said output black point in said saturation-lightness plane, setting an output saturation value equal to said first distance if said target point is not farther than said fifth intersection from said fourth gray color, setting said output saturation value equal to a saturation coordinate of said fifth intersection point if said target point is farther than said fifth intersection point from said fourth gray color, setting an output lightness coordinate equal to said input lightness coordinate if said target point is not farther than said fifth intersection from said fourth gray color, and setting said output lightness coordinate equal to a lightness coordinate of said intersection point if said target point is farther than said fifth intersection point from said fourth gray color;

a second output gray calculator for selecting, on said output white axis, a fifth output gray color having a lightness coordinate equal to said output lightness coordinate; and an output chromaticity calculator for multiplying said unit vector by said output saturation value and adding a resulting product to said fifth output gray color, thereby obtaining output chromaticity coordinates, said input color thus being mapped to an output color having said output lightness coordinate and said output chromaticity coordinates.

26. The apparatus of claim 25, wherein said fourth output gray color has a lightness coordinate equal to said input lightness coordinate.

27. The apparatus of claim 26, wherein said fourth output gray color is identical to said second output gray color.

28. A color conversion apparatus mapping input colors reproducible by a first color image output device to output colors reproducible by a second color image output device, said input colors and said output colors being defined in a color coordinate system with separate lightness and chromaticity coordinates, comprising:

a color parameter memory storing coordinates of an input white color having a maximum lightness reproducible by said first color image output device, an input black color having a minimum lightness reproducible by said first color image output device, said input white color and said input black color defining an input white axis, an output white color having a maximum lightness reproducible by said second color image output device, an output black color having a minimum lightness reproducible by said second color image output device, said output white color and said output black color defining an output white axis, a white vertex color disposed on said input white axis, said white vertex color and said output white color having equal lightness coordinates, and a black vertex color disposed on said input white axis, said black vertex color and said output black color having equal lightness coordinates, and at least three most vivid colors of different hues, said most vivid colors being shades of said hues most vividly reproducible by said second color image output device, and said output white color, said output black color, and said most vivid colors defining vertices of a first polyhedron in said color coordinate system, and said white vertex color, said black vertex color, and said most vivid colors defining vertices of a second polyhedron in said color coordinate system;

a maximum saturator for projecting said input color and said input white axis onto a chromaticity diagram having only chromaticity coordinates, projecting said most vivid colors onto said chromaticity diagram, thereby forming a first polygon having said most vivid colors as vertices in said chromaticity diagram, and determining a first intersection of said first polygon with a first line extending from said input white axis through said input color in said chromaticity diagram;

a lightness calculator for determining an edge color disposed on an edge of said first polyhedron, said edge color and said first intersection having equal chromaticity coordinates;

a second intersection calculator for determining a second input gray color disposed on said input white axis, said edge color and said second input gray color having equal lightness coordinates, constructing a fifth line from said second input gray color to said input color, and determining a surface color disposed at an intersection of said fifth line with a surface of said second polyhedron;

a color projector for mapping said input color to an intermediate color, said intermediate color being equal to said input color if said input color is disposed in said second polyhedron, and said intermediate color being equal to said surface color, if said input color is not disposed in said second polyhedron; and a white adjuster for mapping said intermediate color to a color in said first polyhedron.

29. The apparatus of claim 28, wherein said white adjuster leaves said most vivid colors fixed, does not change lightness coordinates, maps said white vertex color to said output white color, and maps said black vertex color to said output black color.

30. A recording medium storing lightness and chromaticity coordinates of an input white color, an input black color, an output white color, and an output black color, said input white color having a maximum lightness reproducible by a first color image output device, said input black color having a minimum lightness reproducible by said first color image output device, said output white color having a maximum lightness reproducible by a second color image output device, and said output black color having a minimum lightness reproducible by a second color image output device, also storing a computer program for implementing a method of mapping input colors reproducible by said first color image output device to output colors reproducible by said second color image output device, the method comprising the steps of:

determining a scaling coefficient according to a ratio of a lightness difference between said output white color and said output black color to a lightness difference between said input white color and said input black color; and scaling said color coordinate system according to said scaling coefficient.

31. The recording medium of claim 30, wherein said recording medium also stores coordinates of at least three most vivid colors of different hues, said most vivid colors being shades of said hues most vividly reproducible by said second color image output device, and said method further comprises the steps of:

constructing an input white axis comprising colors disposed on a straight segment joining said input white color to said input black color;

constructing an output white axis comprising colors disposed on a straight segment joining said output white color to said output black color;

constructing a first polyhedron having as vertices said most vivid colors, said output white color, and said output black color;

mapping said input colors to output colors within said first polyhedron, said most vivid colors being left fixed.

32. A recording medium storing lightness and chromaticity coordinates of an input white color, an input black color, an output white color, an output black color, and at least three most vivid colors of different hues, said input white color having a maximum lightness reproducible by a first color image output device, said input black color having a minimum lightness reproducible by said first color image output device, said input white color and said input black color defining an input white axis, said output white color having a maximum lightness reproducible by a second color image output device, said output black color having a minimum lightness reproducible by a second color image output device, said output white color and said output black color defining an output white axis, said most vivid colors being shades of said hues most vividly reproducible by said second color image output device, also storing a computer program for implementing a method of mapping input colors reproducible by said first color image output device to output colors reproducible by said second color image output device, the method comprising the steps of:

receiving an input color having a certain input lightness coordinate;

projecting said input color and said input white axis onto a chromaticity diagram having only chromaticity coordinates;

projecting said most vivid colors onto said chromaticity diagram, thereby forming a first polygon having said most vivid colors as vertices in said chromaticity diagram;

determining a first intersection of said first polygon with a first line extending from said input white axis through said input color in said chromaticity diagram; and mapping said input color to an output color having a hue, in relation to said output white axis, identical to a hue of said first intersection point, in relation to said output white axis, said output color being disposed on said output white axis if said input color is disposed on said input white axis, and said output color being equal to said input color if said input color is one of said most vivid colors.

33. The recording medium of claim 32, wherein said step of mapping said input color comprises the further steps of:

selecting, on said output white axis, a first output gray color equal in lightness to said input color, and projecting said first output gray color onto said chromaticity diagram;

constructing, in said chromaticity diagram, a second line from said first output gray color through said first intersection;

selecting, on said second line, an adjusted point such that distances from said input white axis to said first intersection and said input color are in equal ratio to distances from said first output gray color to said first intersection and said adjusted point;

selecting an adjusted color having chromaticity coordinates equal to chromaticity coordinates of said adjusted point and having a lightness coordinate equal to said input lightness coordinate; and mapping said input color to an output color disposed within said first polyhedron on a line segment extending from said output white axis to said adjusted color.

34. The recording medium of claim 33, wherein said line segment extends from said first output gray color to said adjusted color.

35. The recording medium of claim 33, wherein said output color is equal to said adjusted color of said adjusted color is disposed within said first polyhedron, and said output color is disposed on a surface of said first polyhedron if said adjusted color is not disposed within said first polyhedron.

36. The recording medium of claim 32, wherein said step of mapping said input color comprises the further steps of:

selecting, on said input white axis, a first input gray color having a lightness coordinate equal to said input lightness coordinate.

calculating a first distance from said first input gray color to said input color;

selecting an edge color disposed on an edge of said first polyhedron, said edge color and said first intersection having equal chromaticity coordinates;

selecting, on said output white axis, a first output gray color equal in lightness to said input color;

selecting, on said output white axis, a second output gray color equal in lightness to said edge color;

extending a third line from said first output gray color parallel to a line from said second output gray color to said edge color;

determining a second intersection of said third line with a surface of said first polyhedron;

determining a second distance from said first output gray color to said second intersection;

setting a third distance equal to said first distance if said first distance does not exceed said second distance, and equal to said second distance if said first distance exceeds said second distance; and mapping said input color to an output color disposed on said third line at said third distance from said first output gray color.

37. The recording medium of claim 32, wherein said step of mapping said input color comprises the further steps of:

selecting, on said input white axis, a first input gray color having a lightness coordinate equal to said input lightness coordinate.

calculating a first distance from said first input gray color to said input color;

selecting an edge color disposed on an edge of said first polyhedron, said edge color and said first intersection having equal chromaticity coordinates;

selecting, on said output white axis, a second output gray color equal in lightness to said edge color;

projecting said edge color, said second output gray color, said output white color, and said output black color onto a saturation-lightness plane;

selecting, in said saturation-lightness plane, a target point having a saturation coordinate equal to said first distance and a lightness coordinate equal to said input lightness coordinate;

determining a single third intersection, in said saturation-lightness plane, of a line extending from said second output gray color through said target color and lines extending from said edge color through said output white color and said output black color;

determining a fourth distance from said second output gray color to said third intersection;

determining a fifth distance from said second output gray color to said target point;

setting an output lightness coordinate equal to said input lightness coordinate if said fifth distance does not exceed said fourth distance, and to a lightness coordinate of said third intersection if said fifth distance exceeds said fourth distance;

setting an output saturation value equal to said first distance if said fifth distance does not exceed said fourth distance, and to a saturation coordinate of said third intersection if said fifth distance exceeds said fourth distance;

selecting, on said output white axis, a third output gray color having a lightness coordinate equal to said output lightness coordinate;

constructing a fourth line extending from said third output gray color parallel to a line from said second output gray color to said edge color; and mapping said input color to an output color disposed on said fourth line at a distance equal to said output saturation value from said third output gray color.

38. A recording medium storing lightness and chromaticity coordinates of an input white color, an input black color, an output white color, an output black color, and at least three most vivid colors of different hues, said input white color having a maximum lightness reproducible by a first color image output device, said input black color having a minimum lightness reproducible by said first color image output device, said output white color having a maximum lightness reproducible by a second color image output device, said output black color having a minimum lightness reproducible by a second color image output device, said most vivid colors being shades of said hues most vividly reproducible by said second color image output device, also storing a computer program for implementing a method of mapping input colors reproducible by said first color image output device to output colors reproducible by said second color image output device, the method comprising the steps of:

constructing an input white axis comprising all colors disposed on a straight segment joining said input white color to said input black color;

constructing an output white axis comprising all colors disposed on a straight segment joining said output white color to said output black color;

constructing a first polyhedron having as vertices said most vivid colors, said output white color, and said output black color;

selecting, on said input white axis, a white vertex color such that said white vertex color and said output white color have equal lightness coordinates;

selecting, on said input white axis, a black vertex color such that said black vertex color and said output black color have equal lightness coordinates;

constructing a second polyhedron having as vertices said most vivid colors, said white vertex color, and said black vertex color;

mapping said input colors into said second polyhedron, said most vivid colors being left fixed, and input colors disposed on said input white axis being mapped onto said input white axis; and mapping colors in said second polyhedron to colors in said first polyhedron, said most vivid colors being left fixed, lightness coordinates being left unchanged, and colors on said input white axis being mapped to colors on said output white axis.

39. The method of claim 38, wherein said step of mapping said input colors into said second polyhedron preserves hue.

40. The method of claim 38, wherein said step of mapping said input colors into said second polyhedron comprises the further steps of:

receiving an input color having a certain input lightness coordinate;

projecting said input color and said input white axis onto a chromaticity diagram having only chromaticity coordinates;

projecting said most vivid colors onto said chromaticity diagram, thereby forming a first polygon having said most vivid colors as vertices in said chromaticity diagram;

determining a first intersection of said first polygon with a first line extending from said input white axis through said input color in said chromaticity diagram;

determining an edge color disposed on an edge of said second polyhedron such that said edge color and said first intersection have equal chromaticity coordinates;

determining a second input gray color disposed on said input white axis, said edge color and said second input gray color having equal to lightness coordinates;

constructing a fifth line from said second input gray color through said input color; and mapping said input color to a surface color disposed at an intersection of said fifth line with a surface of said second polyhedron if said input color is disposed exterior to said second polyhedron, said input color being left fixed if said input color is disposed within said second polyhedron.

\* \* \* \* \*